United States Patent
Clay et al.

(10) Patent No.: US 10,581,252 B2
(45) Date of Patent: Mar. 3, 2020

(54) POWER SUPPLY CHARGING SYSTEM

(71) Applicant: Katlego Systems, LLC, Flint, MI (US)

(72) Inventors: Rodney L. Clay, Flint, MI (US); Lloyd W. Williams, Flint, MI (US); Wally J. Clay, Grand Blanc, MI (US)

(73) Assignee: Katlego Systems, LLC, Flint, MI (US)

( * ) Notice: Subject to any disclaimer, the term of this patent is extended or adjusted under 35 U.S.C. 154(b) by 6 days.

(21) Appl. No.: 15/947,522

(22) Filed: Apr. 6, 2018

(65) Prior Publication Data

US 2018/0233927 A1     Aug. 16, 2018

Related U.S. Application Data

(63) Continuation of application No. 15/622,767, filed on Jun. 14, 2017, now Pat. No. 9,941,710.

(Continued)

(51) Int. Cl.
   *H02J 7/00*           (2006.01)
   *H02J 9/00*           (2006.01)
   *H02J 7/14*           (2006.01)

(52) U.S. Cl.
   CPC ............ *H02J 7/0013* (2013.01); *H02J 7/007* (2013.01); *H02J 7/1415* (2013.01);

(Continued)

(58) Field of Classification Search
None
See application file for complete search history.

(56) References Cited

U.S. PATENT DOCUMENTS 4,689,531 A    8/1987 Bacon
5,545,935 A    8/1996 Stewart
(Continued)

FOREIGN PATENT DOCUMENTS

CA    2882780 A1 *   5/2015   ............ H02K 53/00
CA    2882780 A1     5/2015
(Continued)

OTHER PUBLICATIONS

International Search Report and Written Opinion, Application No. PCT/US2017//037456 dated Sep. 8, 2017.
(Continued)

*Primary Examiner* — Jared Fureman
*Assistant Examiner* — Joel Barnett
(74) *Attorney, Agent, or Firm* — The Dobrusin Law Firm, P.C.; Daniela M. Thompson-Walters

(57) ABSTRACT

A power supply charging system having first and second alternating power cells, a motor driven generator adapted to operably switch between providing power between the first and second alternating power cells, a third power cell which supplies power to the motor driven generator, and a control system having a power cell managing module and a charge control module. The power cell module is adapted to alternate the motor driven generator to operably switch between providing power to the first and second alternating power cells. The charge control module is adapted to detect the occurrence of a pre-determined power supply condition to activate the motor driven generator to provide power to the first or second alternating power cells. The power supply charging system may find particular use in generating a direct current, converting the direct current to an alternating current, and providing a continuous alternating current to a facility or equipment.

19 Claims, 9 Drawing Sheets

Related U.S. Application Data

(60) Provisional application No. 62/507,445, filed on May 17, 2017, provisional application No. 62/350,326, filed on Jun. 15, 2016.

(52) U.S. Cl.
CPC .......... *H02J 7/1423* (2013.01); *H02J 7/1438* (2013.01); *H02J 9/00* (2013.01)

(56) References Cited

U.S. PATENT DOCUMENTS

| | | | |
|---|---|---|---|
| 5,784,249 A * | 7/1998 | Pouliot | H02G 3/0493 174/68.1 |
| 7,782,015 B1 | 8/2010 | Aaron | |
| 8,907,597 B2 | 12/2014 | Kim | |
| 9,263,898 B1 * | 2/2016 | Ghazarian | H02J 7/0019 |
| 2003/0102752 A1 | 6/2003 | Mathisen | |
| 2004/0164705 A1 | 8/2004 | Taniguchi | |
| 2010/0187821 A1 | 7/2010 | De Souza | |
| 2010/0270883 A1 | 10/2010 | Teoh et al. | |
| 2012/0091731 A1 | 4/2012 | Nelson | |
| 2012/0161564 A1 | 6/2012 | Lee et al. | |
| 2012/0286572 A1 | 11/2012 | Tracy | |
| 2013/0320929 A1 | 12/2013 | Walker et al. | |
| 2014/0265695 A1 | 9/2014 | Thompson | |
| 2015/0048703 A1 * | 2/2015 | Maldonado | G06Q 50/06 310/113 |
| 2015/0069960 A1 * | 3/2015 | Kuraishi | B60L 58/12 320/107 |
| 2015/0333543 A1 * | 11/2015 | Hempel | H01M 10/441 320/129 |
| 2016/0226249 A1 | 8/2016 | Sakuma | |
| 2017/0210240 A1 | 7/2017 | Unno | |

FOREIGN PATENT DOCUMENTS

| | | |
|---|---|---|
| CN | 102844222 A | 12/2012 |
| CN | 105515209 A | 9/2017 |
| CN | 105576677 A | 4/2018 |
| EP | 2363940 A2 | 9/2011 |
| WO | 2002/035677 A1 | 5/2002 |
| WO | 2012/093923 A1 | 7/2012 |

OTHER PUBLICATIONS

Chinese First Office Action dated Oct. 21, 2019, Application No. 201780048672.1.

* cited by examiner

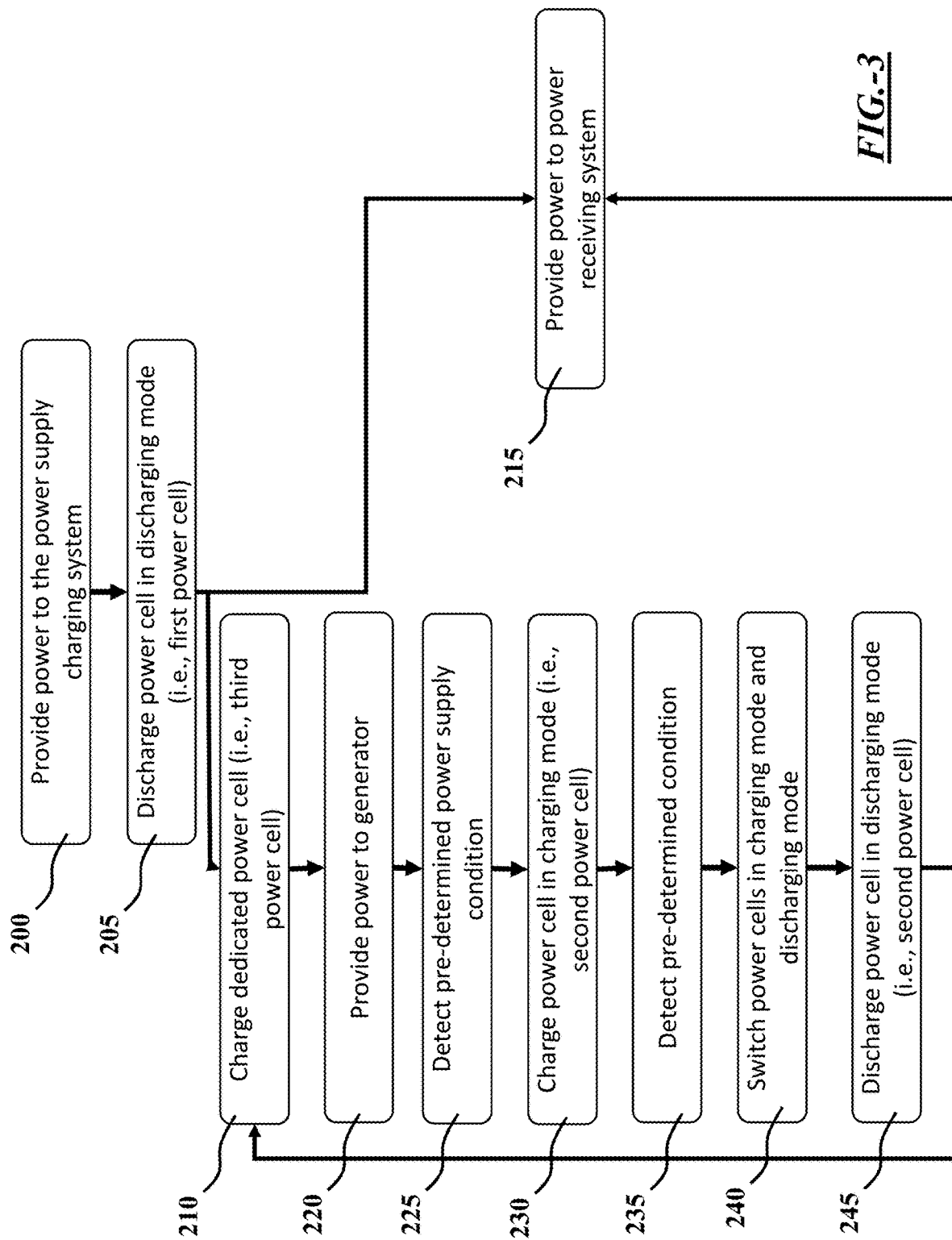

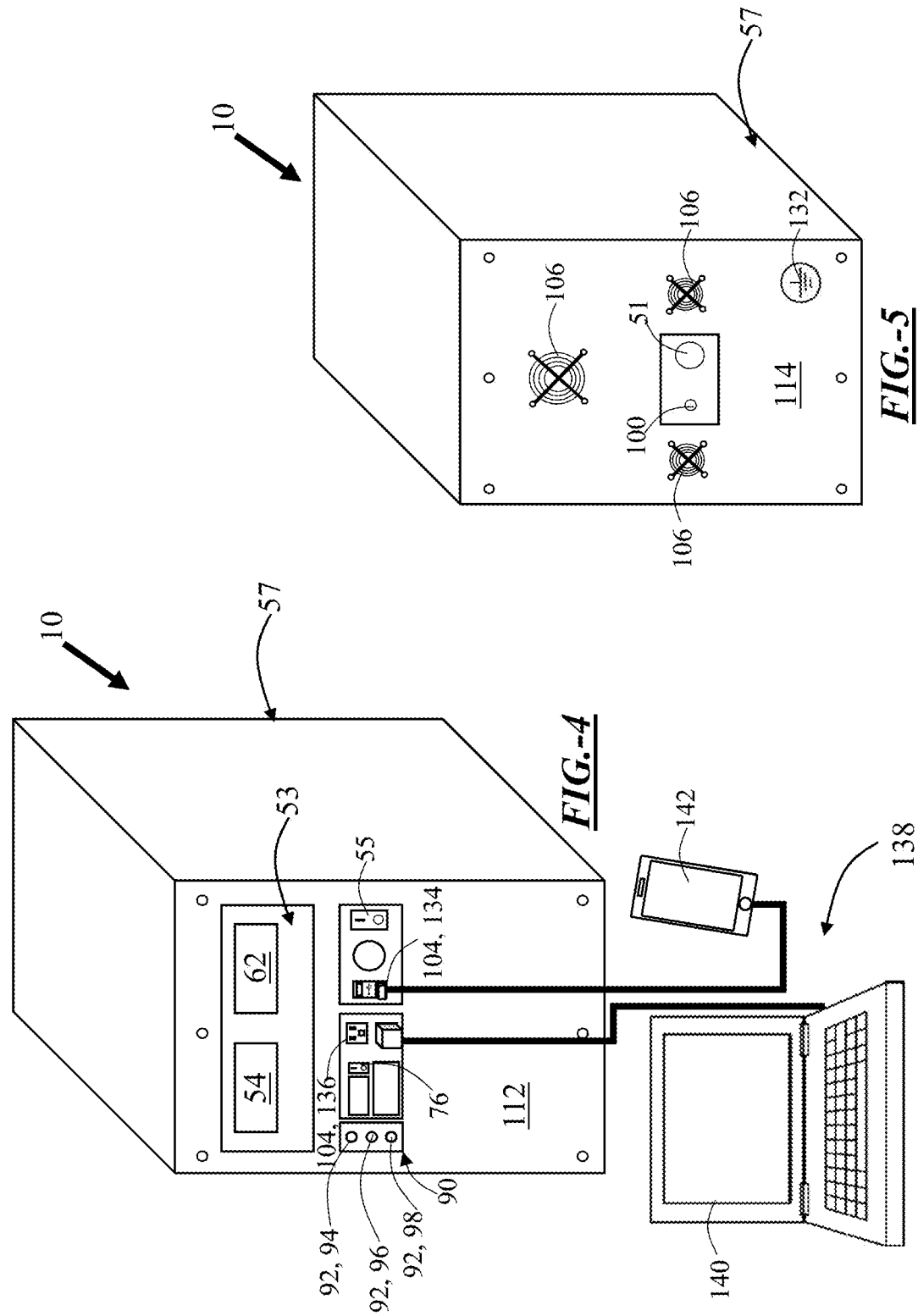

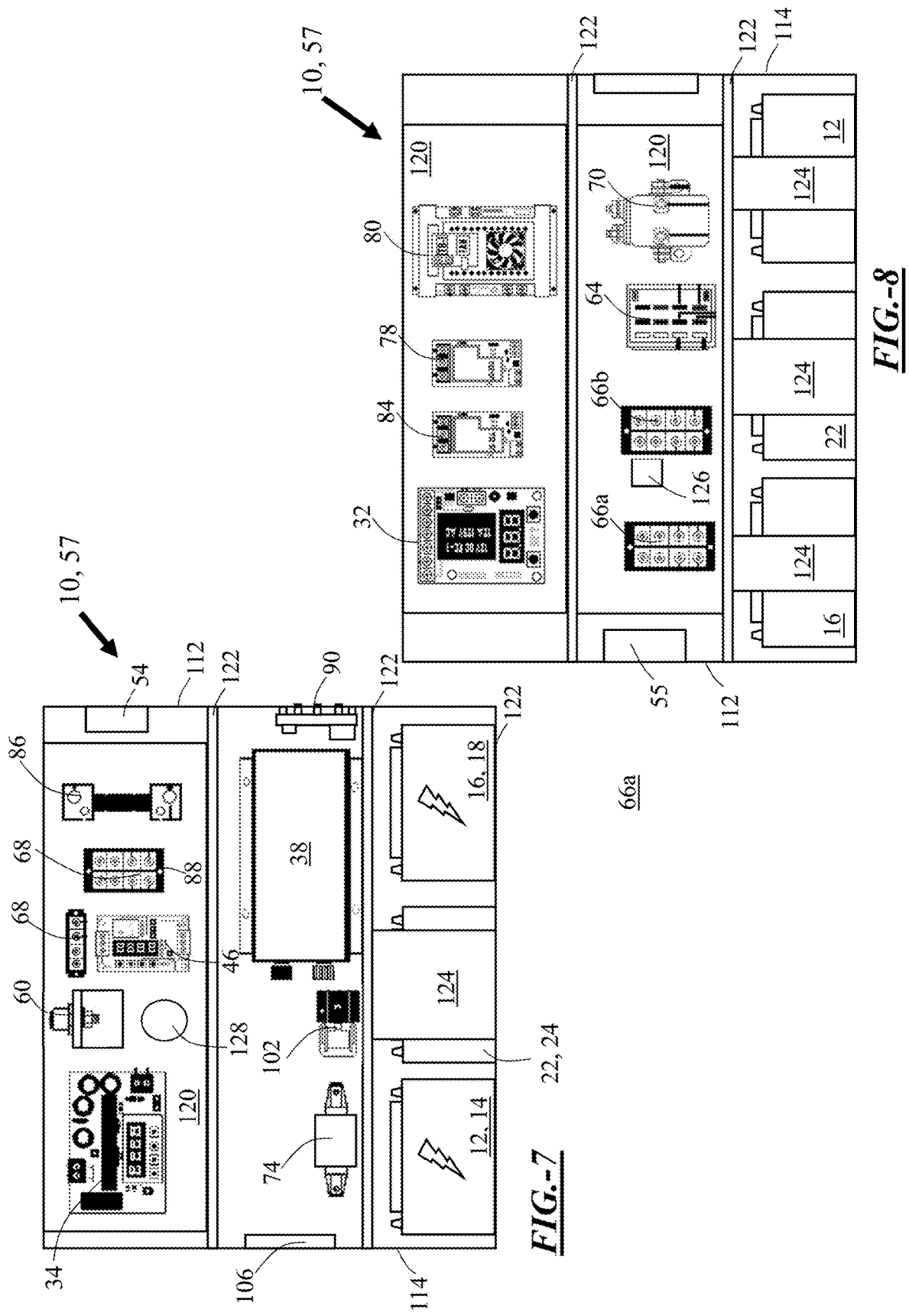

POWER SUPPLY CHARGING SYSTEM

FIELD

The present disclosure relates to a power supply charging system. The present disclosure may relate to a power supply charging system which is able to be adapted for a number of both fixed and portable applications. The present disclosure may specifically relate to a power supply charging system adapted to alternatingly charge and discharge two or more power cells to provide a continuous current.

BACKGROUND

During power outages, consumers may use portable gasoline-powered generators. Traditional portable gasoline powered generators provide just enough power to keep a few home appliances running during a power outage. Portable gasoline-powered generators require constant attention to ensure the generators are being used safely. Some of the limitations of portable gasoline-powered generators include: the need to be located in well ventilated locations, usually physically outside of a home or other building; the need to prevent exhaust fumes from entering an interior of the home or building; and having to cool the generator before refueling.

Recent natural disasters have increased sales and installations of standby gas generators as opposed to portable gasoline-powered generators due to their attractive longevity for energizing a home. While standby generators may energize a home for a number of days, they are expensive to install as they must be integrated with a home's electrical system and have an ongoing fuel cost to remain operational. Installing and using a standby gas generator may present a number of problems aside from installation and operational costs. A standby gas generator is generally installed in an outdoor space which makes urban installations potentially impossible. A standby gas generator is dependent on fossil fuel for continuous operation. Standby generators may operate at decibel levels above that permitted by local ordinances. Standby generators may require a professional installations, local permits, and inspections to install the unit to a home or building.

Due to the challenges faced with portable and standby gas generators and a general desire for more environmental friendly power sources, consumers have sought alternative options for off-grid power. Alternative options include solar power, wind power, and micro-hydro power. Solar power is able to draw energy from the sun and function for a long period of time by having a system with photovoltaic solar panels, an inverter, and batteries. Solar power systems may be easy to maintain after an initial installation with minimal maintenance. The draw back to solar power may be that it may take years, if not decades, to receive a return on investment after the initial installation and the performance of a solar power system will vary dramatically depending on geographic location and exposure to the sun. Wind powered systems are able to generate electricity based on wind by having residential (or larger) sized wind turbines. Wind turbines must rely on wind energy to successfully allow the home to be powered off the grid, may be unsightly due to the turbine installed on outdoor property, and may be difficult to install in urban locations due to needing real estate for the installation. Micro-hydro power systems use a source of running water, such as a stream, to generate electricity. Micro-hydro power systems require a running water source in close proximity to take advantage of the energy produced by the flow of water to generate electricity.

As alternative energies have been explored, the use of batteries to provide long-term off-grid power has also been explored. For example, US Patent Application Nos. 2012/0161564, US 2010/0270883 and U.S. Pat. No. 7,782,015 teach alternative energy systems which rely on battery power. Barriers faced by using batteries including working within the constraints of the law of conservation of energy by avoiding the design of a perpetual motion machine (i.e., closed-loop system). In order to avoid designing a perpetual motion machine, some have integrated the battery-based systems with other alternative energy sources to provide external energy to charge batteries. The charged batteries are then discharged or depleted to provide a power supply to a home or building. An example includes US Patent Application No. US 2014/0265695. Notwithstanding the above, there is still a need for developing an alternative power supply which is able to run independent of an external energy source which relies on the environment (e.g., sun, wind, water), does not require large outdoor property for installation, a method which does not simultaneously deplete a battery while trying to charge the battery, preventing the design of a closed-loop system, and optimizing the system for compatibility with modern, high energy capacity batteries (i.e., batteries having a high charge rate).

What is needed is a power supply charging system which may be portable to adapt to a number of locations, fixed to a specific location, or can be adapted for both. What is needed is a power supply charging system which does not need to be installed on outside property of a facility and can be used safely inside of a facility. What is needed is a power supply charging system which is able to operate off-grid without relying on local environment (i.e., sun, wind, or water) but may be compatible with alternative energy systems. What is needed is a power supply charging system which is reliable and is able to run for extended periods of time with minimal intervention by a user. What is needed is a power supply charging system which is environmentally friendly with a reduced carbon footprint even with continuous use. What is needed is a power supply charging system which does not try to bypass the law of conservation of energy and is not a perpetual motion machine (i.e., closed loop system). What is needed is a system which includes a dedicated energy supply integrated into the supply for recharging one or more batteries and allowing the system to deliver continuous energy to its surroundings.

SUMMARY

The present disclosure relates to a power supply charging system which may be self-sufficient. The power supply charging system includes alternating power cells which upon discharge provide a power supply to an external point, a control system to manage the charging and discharging of the power cells, a generator with a motor to alternatingly charge the power cells, and a separate power cell dedicated to supplying power to the generator and motor. The power supply charging system may include a power inverter and/or converter to convert a direct current into an alternating current or a different direct current so that the power supply may be useful in a variety of portable, residential, and/or commercial applications. The power supply charging system may generally function by having a discharging power cell (i.e., an active battery bank) transmit a direct current (DC) to a converter, inverter, or both which then provide the power supply as a differing direct current and/or alternating current (AC) to the external point. The discharging power cell may provide more energy than utilized by the external point which is surplus energy. This surplus energy may then be transmitted to the motor and/or generator to charge a charging power cell (i.e., an inactive battery bank).

The present disclosure relates to a power supply charging system comprising: (a) a first power cell adapted to be at least partially charged when in a charging mode, to supply power when in a discharging mode, and optionally to maintain a generally constant supply of power while in a resting mode; (b) a second power cell adapted to be at least partially charged when in a charging mode, to supply power when in a discharging mode, and optionally to maintain a generally constant supply of power while in a resting mode, wherein the first power cell is in the charging mode the second power cell is either in the discharging mode or the resting mode and when the second power cell is in the charging mode the first power cell is either in the discharging mode or the resting mode; (c) a motor driven generator, the motor driven generator being adapted to operably switch between providing power to the first power cell during the charging mode of the first power cell and alternatingly providing power to the second power cell during the charging mode of the second power cell; (d) a third power cell adapted to operably supply power to the motor driven generator; and (e) a control system which includes: (i) a power cell managing module adapted to alternate the motor driven generator to operably switch between providing power to the first power cell during the charging mode of the first power cell and providing power to the second power cell during the charging mode of the second power cell based on an occurrence of a pre-determined condition; and (ii) a charge control module adapted to detect the occurrence of a pre-determined power supply condition from at least one of the first power cell or the second power cell while in the charging mode or the resting mode and upon the occurrence of the pre-determined power supply condition activates the motor driven generator to provide power to the first power cell while in the charging or resting mode or the second power cell while in the charging or resting mode.

The first power cell may be a first bank of batteries and the second power cell may be a second bank of batteries. The first bank of batteries, second bank of batteries, and/or the third power cell may include an alkaline battery, an aluminum battery, a carbon battery, a lithium battery, a lithium-ion battery, a mercury battery, a zinc battery, a lead-acid battery, a nickel battery, or a combination thereof. The first bank of batteries and the second bank of batteries may not simultaneously be or may partially overlap in the charging mode, discharging mode, or the resting mode. The third power cell may be in electrical communication with at least one of the first power cell or the second power cell in a manner so that when the first power cell or the second power cell in in the discharging mode, the first power cell or the second power cell supplies power to at least partially recharge the third power cell. The motor driven generator may be driven by an electric motor. The third power cell may supply power to the electric motor. The first bank of batteries in the discharging mode may supply power to a facility or equipment and the second bank of batteries in the discharging mode may supply power to the facility or equipment. The pre-determined condition and/or the pre-determined power supply condition may include a duration of time, a temperature, a voltage, a current, or any combination thereof. The power cell managing module may send direct electrical current from the first bank of batteries and the second bank of batteries to the one or more current inverters to be converted into the alternating electrical current.

The present disclosure relates to a method of operating the power supply charging system to provide a continuous power supply to a power receiving system, the method may include: (i) discharging the first power cell to provide power to the third power cell and the power receiving system; (ii) providing power to the motor driven generator by the third power cell so that the generator is able to provide power to the second power cell; (iii) detecting the pre-determined power supply condition of the second power cell by a charge control module while the second power cell is in the charging or resting mode; (iv) charging the second power cell while in the charging mode by sending power from the motor driven generator to the second power cell; (v) detecting the occurrence of the pre-determined condition by the power cell managing module; (vi) switching the first power cell to a charging mode and the second power cell to a discharging mode; (vii) discharging the second power cell to provide power to the third power cell and the power receiving system; (viii) providing power to the motor driven generator by the third power cell so that the generator is able to provide power to the first power cell; (ix) detecting the pre-determined power supply condition of the first power cell by the charge control module while the first power cell is in the charging or resting mode; and (x) charging the first power cell while in the charging mode by sending power from the motor driven generator to the first power cell.

The present disclosure relates to a method of operating the power supply charging system to provide a continuous power supply to a power receiving system, the method may include: (i) discharging a first power cell to provide power to a third power cell and a power receiving system; (ii) providing electrical energy to an electric motor by the third power cell so that the electric motor converts the electrical energy to mechanical energy in the form of torque; (iii) multiplying the torque via one or more torque multipliers to provide an increased torque; (iv) transferring the increased torque to the motor driven generator so that the generator converts the increased torque to an electrical power supply; (v) detecting a pre-determined power supply condition of a second power cell by a charge control module while the second power cell is in the charging or resting mode; (vi) charging the second power cell while in the charging mode by sending the electrical power supply from the motor driven generator to the second power cell; (vii) detecting the occurrence of a pre-determined condition by the power cell managing module; (viii) switching the first power cell to a charging mode and the second power cell to a discharging mode; (ix) discharging the second power cell to provide power to the third power cell and the power receiving system; (x) providing electrical energy to the electric motor by the third power cell so that the electric motor converts the electrical energy to mechanical energy in the form of torque; (xi) multiplying the torque via one or more torque multipliers to provide an increased torque; (xii) transferring the increased torque to the motor driven generator so that the generator converts the increased torque to an electrical power supply; (xiii) detecting a pre-determined power supply condition of the first power cell by the charge control module while the first power cell is in a charging or resting mode; and (xiv) charging the first power cell while in the charging mode by sending power from the motor driven generator to the first power cell.

The power supply charging system provides a system which may be adaptable for portable locations and may be adapted to fixed installations. As the power supply charging system may have one or more batteries as power cells, the power supply charging system is able operate without resulting fumes and is thus able to be safely used inside of a home or other facility. The power cells may operate or be free of operating with fossil fuels, thus the power supply charging system offers an environmental friendly energy alternative with a reduced carbon footprint. The power supply charging system may be able to be adapted for integration with outer power supply charging systems, other alternative energy sources, or both to provide for a greater operating range and take advantage of local environment energy sources. The power supply charging system may provide a reliable power supply requiring minimal user intervention by generating energy independent of the environment (e.g., sun, wind, water). To avoid the use of a perpetual motion machine, the system may be configured as an open system as opposed to a closed loop system.

BRIEF DESCRIPTION OF DRAWINGS

FIG. 3 illustrates an exemplary flow of generating power by the power supply charging system according to the teachings.
FIG. 4 illustrates a housing of an exemplary power supply charging system.
FIG. 5 illustrates a housing of an exemplary power supply charging system.
FIG. 7 illustrates an interior view of an exemplary power supply charging system.
FIG. 8 illustrates an interior view of an exemplary power supply charging system.

DETAILED DESCRIPTION

Figure 1:
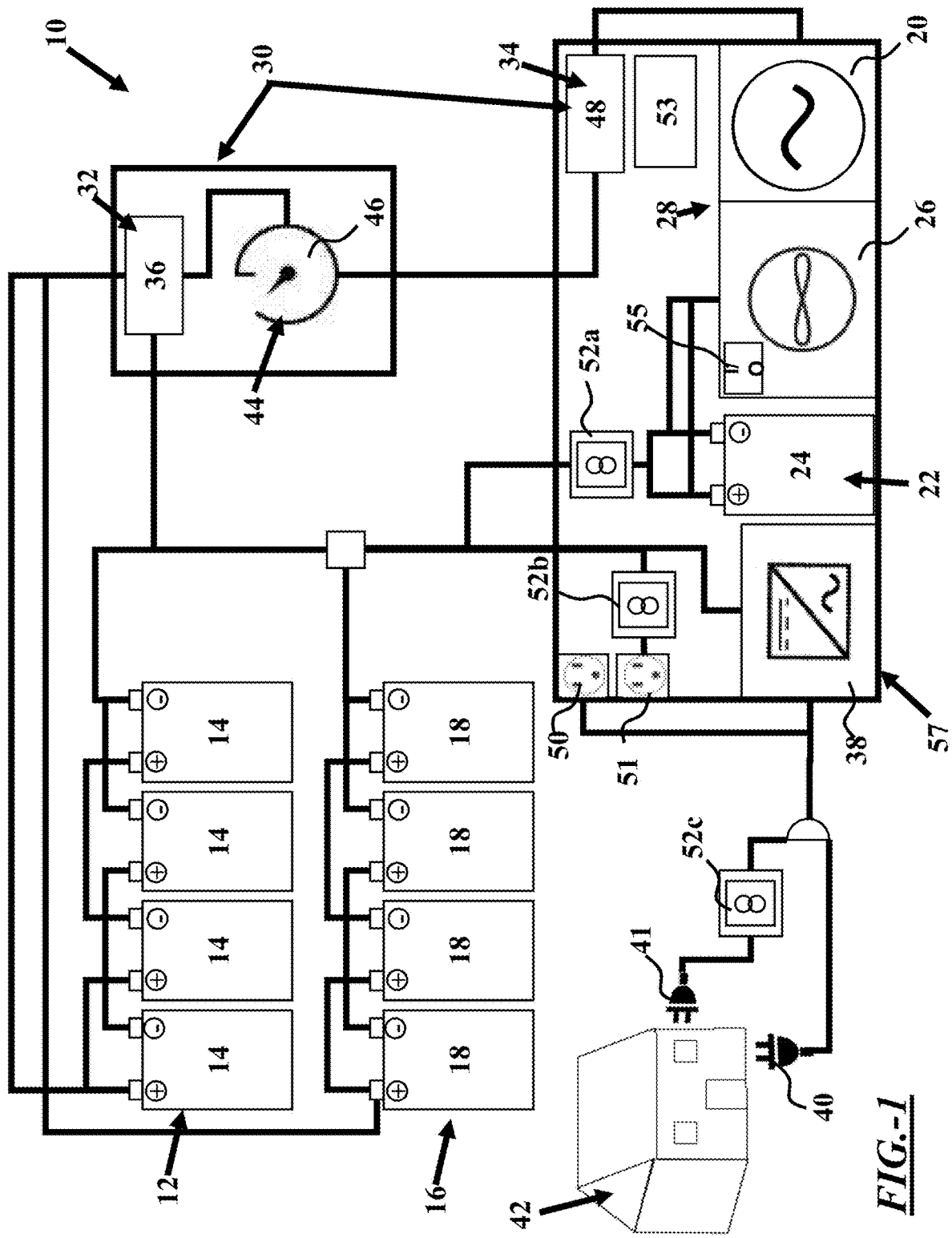
FIG. 1 illustrates a power supply charging system according to the teachings.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present disclosure relates to a power supply charging system. The power supply charging system may function to provide an off grid power supply to a facility, equipment, or other devices which require alternating current and/or direct current to operate. The power supply charging system may function to provide a continuous, semi-continuous, or discontinuous power supply. The supply charging system may function to provide a continuous direct current and/or alternating current to a power receiving system. The power supply charging system may be a self-sufficient power supply. By being self-sufficient, the power supply charging system may be able to generate a power supply and provide a power supply. The power supply charging system includes a plurality of power cells, a control system, and a generator. The power supply charging system may include a number of additional components to cooperate with the power cells, control system, and/or generator. The components may include one or more power converters, one or more power inverters, one or more relays, one or more busbars, one or more power outputs, one or more sensing devices, one or more interface modules, one or more meters, one or more thermal controls, one or more user interfaces, one or more switches, one or more housing units, the like, or any combination thereof.

The power supply charging system includes a plurality of power cells which both hold a charge and release a charge. The plurality of power cells may work together in an alternating fashion. By working together in an alternating fashion, a least one power cell may be charged while another power cell is discharged. Discharging a power cell may provide a power supply to a power receiving system, another power cell, or both.

The power supply charging system may be adapted such that it generates a surplus of power. The surplus of power may be defined as an excess of what a power receiving system may utilize. The surplus of power may be used to charge one or more power cells.

The power supply charging system includes a control system. The control system may manage which power cell is charging and which power cell is discharging. The control system may manage or direct one or more components of the power supply charging system to cooperate together. The control system may manage and direct flow of a power supply through one or more components of the power supply charging system.

The power supply charging system includes a generator. The generator may transmit a power supply to one or more power cells. By transmitting power to the one or more power cells, the generator may charge the power cell. The generator may cooperate with the control system to provide a power supply to a specific power cell. The generator may cooperate with the control system to provide a power supply in an alternating fashion. The generator may be receive a power supply from a power cell separate from the power cells to which it transmits a power supply to.

The present disclosure provides a power supply charging system which may be permanently or semi-permanently fixed to a power receiving system, temporarily connected to a power receiving system, or both. A power receiving system may include any type of facility, building, vehicle, equipment, electronic utilities, electronic-based devices which utilize alternating current (AC) and/or direct current (DC), the like, or any combination thereof. Exemplary facilities or buildings may include single family homes, multi-family units, offices, building structures, hospitals, any other building structure, the like, or any combination thereof. Exemplary vehicles may include land-based vehicles, watercraft, aircraft, recreational vehicles (RV), camping trailers, the like, or any combination thereof. Exemplary equipment may include manufacturing equipment, farm equipment, construction equipment, medical equipment, laboratory equipment, office equipment, the like, or any combination thereof.

The present disclosure provides for a power supply charging system having two or more open systems. The two or more open systems may function to simulate a closed loop system without encountering the limitations of a closed loop system. The two or more open systems may function to provide a power supply to a power receiving system, charge a power cell, discharge a power cell, or any combination thereof. The two or more open systems may include at least a first open system and a second open system.

The two or more open systems may include a first open system. The first open system may function to provide a power supply to a power receiving system. The first open system may include a discharging power cell in electrical communication to the power receiving system. The first open system may include the discharging power cell sending a power supply to one or more inverters, one or more converters, or both. The one or more inverters, one or more converters, or both may then transmit the power supply to the power receiving system. For example, a power cell in a discharging mode (i.e., a first power cell, active battery bank) may send a power supply (i.e., direct current) to a converter and/or an inverter. The converter and/or inverter may then change the current (i.e., different direct current, alternating current) and send the power supply to the power receiving system.

The two or more open systems may include a second open system. The second open system may function to provide a power supply to a power cell in a charging mode to charge the power cell. The second open system may include a discharging power cell in electrical communication with another power cell. The second open system may include a power cell in continuous communication with a motor, generator, or both. The second power cell may include a motor and/or generator in communication with a power cell in a charging mode. For example, a power cell in a discharging mode (i.e., a first power cell, active battery bank) may send a power supply (i.e., direct current) to a dedicated power cell (i.e., third power cell). The dedicated power cell may send the power supply to a motor and/or generator. The motor and/or generator may then transmit the power supply to a power cell in a charging mode (i.e., a second power cell, inactive battery bank).

The power supply charging system may be adaptable for cooperating with one or more other power systems. By cooperating with one or more other power systems, the power supply charging system may be able to supply power to larger facilities, have a back-up charging system, or both. The power supply charging system may be adapted for connecting to one or more additional power supply charging systems. The power supply charging system may connect to one or more additional power supply charging systems through the electrical system of a facility. The power supply charging system may cooperate with one or more additional power supply charging systems through the electrical system of a facility. For example, the power supply charging systems may be connected through smart wiring integrated in the home. Smart wiring may allow the systems to communicate with one another, be controlled by a master control system, or both. The power supply charging system may cooperate with one or more additional power supply charging systems by each system being dedicated to a segment of the facility. For example, one power supply may be dedicated to a specific floor or section of rooms of a facility, another power supply may be dedicated to another floor or section of rooms, and so forth.

The power supply charging system may be compatible with other alternative energy systems (i.e., wind, solar, power). The alternative energy systems may provide a back-up energy supply to charge one or more power cells. The power supply charging system may connect to an alternative energy system so that the systems are in electrical communication with the plurality of power cells that are charged by the generator. The charge control module may be adapted for connecting to the alternative energy system. The charge control module may be adapted for determining when to use the alternative energy system to charge a power cell in a charging mode as opposed to using a generator.

The present disclosure relates to a power supply charging system having first and second alternating power cells, a motor driven generator adapted to operably switch between providing power between the first and second alternating power cells, a third power cell which supplies power to the motor driven generator, and a control system having a power cell managing module and a charge control module. The power cell module is adapted to alternate the motor driven generator to operably switch between providing power to the first and second alternating power cells. The charge control module is adapted to detect the occurrence of a pre-determined power supply condition to activate the motor driven generator to provide power to the first or second alternating power cells. The power supply charging system may find particular use in generating a direct current, converting the direct current to an alternating current, and providing a continuous alternating current to a home or facility.

The power supply charging system includes a plurality of power cells. The power cells may function to receive power, supply power, maintain a generally constant supply of power, store a supply of power, or any combination thereof. A plurality of power cells may function to supply power to a power inverter, power converter, a separate power cell, a power outlet, or any combination thereof. A plurality of power cells may function to alternatingly supply power and receive power. A separate power cell may function to supply power to a motor, generator, or both. A separate power cell may function to alternatingly receive power from a plurality of power cells. The plurality of power cells may include a first power cell, a second power cell, a third power cell, or even more power cells. One or more of the power cells may be in electrical communication with a control system, a power cell managing module, a charge control module, one or more relays, one or more sensing devices, one or more inverters, one or converters, one or more generators, one or more motors, any other component of the power supply charging system, or any combination thereof. A plurality of power cells (e.g., a first and second power cell) may be in alternating electrical communication a generator. One or more power cells (i.e., power cell in discharging mode) may be in electrical communication with and provide a power supply to one or more other power cells (i.e., third power cell, dedicated power cell). One or more power cells which receive a power supply (i.e., charged) from a generator may provide a power supply to (i.e., charge) one or more power cells (i.e., dedicated power cell) which provide a power supply to the generator.

The plurality of power cells may include any type of power cell capable of retaining a power supply, discharging a power supply, and receiving a power supply. The plurality of power cells may be electrical, electrochemical, or both. The plurality of power cells may also include or be in communication with forms of alternative energy. Alternative energy may include solar power, wind power, hydro power, geothermal, the like, or any combination thereof. The plurality of power cells may include one or more energy storage units. Energy storage units may include one or more capacitors, one or more superconducting magnetic storage systems, one or more batteries, one or more supercapacitors, the like, or any combination thereof. Exemplary suitable batteries may include an alkaline battery, an aluminum battery, a carbon battery, a lithium battery, a lithium ion battery, a mercury battery, a zinc battery, a lead acid battery, a nickel battery, the like, or any combination thereof.

A plurality of the power cells may be capable of producing and generating surplus energy by cooperating with one or more other components of the system. The surplus energy may function to charge one or more other power cells. Each individual power cell which provides power to a power receiving system (i.e., first and second power cell) may have an energy capacity sufficient to generate both a power supply for the power receiving system and to charge another power cell. Energy capacity may be greater than the average power use and peak use of the power receiving system. The energy capacity may be about equal to, at least about 2 times greater than, at least about 2.5 times greater than, at least about 3 times greater than, or even at least about 4 times greater than the average power use and/or peak use of the power receiving system. The energy capacity of a power cell is preferably not be less than the average power use of one or more devices or components of a power receiving system. For example, the energy capacity of the power cell may be about 3 times greater than the average power used by the facility. For example, the energy capacity of the power cell may be about equal to the average power use by a plurality of mobile devices. For further example, a power receiving system may include a plurality of mobile devices. The mobile devices may include one or more laptops, one or more mobile phones, one or more tablets, and one or more printers. The one or more laptops may have an average draw of about 15-75 Watts; the one or more mobile phones and/or one or more tablets may have an average draw of about 3-10 Watts; and/or the one or more printers may have an average draw of about 3 to 50 Watts. The energy capacity of a power cell suitable for charging the plurality of mobile devices while also being able to send current to another power cell, motor, and/or generator may be about 60-80 Watts. For example, a suitable power cell for a plurality of mobile devices may be a typical 12V, 76.8 watt hours battery and the battery may be a lithium ion battery.

The plurality of power cells may be designed with a usage ratio to provide a surplus of energy. The usage ratio may be a ratio of a power supply transmitted by a discharging power cell. The usage ratio may be a ratio of a power supply provided to a power receiving system as opposed to a power cell dedicated to charging a generator. The ratio may be about 70% or greater of the power supply is provided to the power receiving system, about 80% or greater of the power supply is provided to the power receiving system, or even about 90% or greater of the power supply is provided to the power receiving system. The ratio may be about 98% or less of the power supply is provided to the power receiving system, about 97% or less of the power supply is provided to the power receiving system, or even about 95% or less of the power supply is provided to the power receiving system. The energy capacity, the ratio of power supply provided to the power receiving system as opposed to the dedicated power cell, or both ensure the dedicated power cell has a sufficient power supply to transmit to the generator.

The plurality of power cells may include power cells having high charge rates. High charge rates may function to allow the plurality of power cells to be charged at a faster rate than a power receiving system depletes the plurality of power cells. By charging at a faster rate than depletion, the plurality of power cells are able to provide a continuous current to a power receiving system. High charge rates may be from about 0.4 C or greater, about 0.5 C or greater, or even about 0.6 C or greater. High charge rates may be from about 1.0 C or less, 0.9 C or less, or even about 0.8 C or less. Exemplary power cells having high charge rates may include lithium ion batteries, carbon batteries, or both. The plurality of power cells may include power cells adapted for being charged with a current of about 5 A or greater, about 10 A or greater, about 20 A or greater, about 25 A or greater, or even about 30 A or greater. The plurality of power cells may include power cells adapted for being charged with a current of about 60 A or less, about 55 A or less, or even about 50 A or less.

The plurality of power cells may have high life cycles to allow the power cells to be used in the power supply charging system for an extended period of time. The plurality of power cells may have a cycle durability of about 350 cycles or greater, about 500 cycles or greater, about 1,000 cycles or greater. The plurality of power cells may have a cycle durability of about 5,000 cycles or less, about 4,000 cycles or less, or even about 3,500 cycles or less. As battery, and another energy storage technology, continues to develop and improve, the life cycles may become even greater allowing for an even longer use of the power cell in the power supply charging system.

The plurality of power cells may be arranged in at least three separate power cells (i.e., first power cell, second power cell, third power cell). The individual power cells may be connected in series, parallel, or a combination of both to other individual power cells. Individual power cells may be connected in parallel to other individual power cells. Connecting the individual power cells in parallel to one another may enable a generator to operably switch charging among individual power cells, enable alternating discharging the individual power cells, or both. The individual energy storage units which comprise a single power cell may be connected in series, parallel, or a combination of both to other energy storage units of the same power cell.

The plurality of power cells may be in electrical communication with one or more components of the power supply charging system. By being in electrical communication, the one or more of the power cells may be able to receive and/or transmit electrical current to and/or from one or more of the components. One or more components may be any component of the power supply charging system. Electrical communication may mean directly electrically connected to a component or indirectly electrically connected to a component. One or more power cells may be directly electrically connected to one or more of a charge control module, power cell managing module, diode, relay, busbar, motor speed controller, power switch, user interface, charging status display, motor, generator, or any combination thereof.

The plurality of power cells may include one or more electrical current modes. The one or more electrical current modes may function to allow the one or more power cells to supply power (i.e., discharge), be supplied with power (i.e., charge), retain power, and/or prevent any transmission of power. The one or more electrical current modes may be any mode which allow a plurality of power cells to supply power, be supplied with power, retain power, and/or prevent transmission of power. The one or more electrical current modes may include a charging mode, discharging mode, resting mode, or any combination thereof. A plurality of power cells be in the same mode simultaneously or may not be in the same mode simultaneously. A first power cell (i.e., first bank of batteries) and a second power cell (i.e., second bank of batteries) may not simultaneously be in a charging mode, discharging mode, or resting mode. A first power cell (i.e., first bank of batteries) and a second power cell (i.e., second bank of batteries) may simultaneously be in a charging mode, discharging mode, or resting mode. The plurality of power cells may alternate electrical current modes. Alternating electrical current modes may include one power cells in a charging mode switching to a discharging mode when another power cell switches from a discharging mode to a charging mode. A control system may determine the electrical current mode, may change the electrical current mode, may communicate the electrical current mode of one or more of the power cells to one or more components of the power supply charging system, or any combination thereof.

One or more power cells have a charging mode. The charging mode may function to enable one or more power cells to receive a power supply (i.e. be charged), a generator to supply power to a power cell, or both. One or more of the power cells may be adapted to be at least partially charged when in a charging mode. In a charging mode, one or more power cells may receive a power supply from a generator or another power cell. Preferably, the one or more power cells which are adapted to discharge a power supply through a power outlet, an inverter, a converter, or any combination thereof are adapted to receive power from the generator. Preferably, the power cell adapted to charge the motor and/or generator is adapted to receive power from another power cell.

One or more power cells have a discharging mode. The discharging mode may function to enable one or more power cells to transmit a power supply, to restrict or prevent a generator from supplying power to the power cell, or both. One or more of the power cells may be adapted to supply power when in a discharging mode. In a discharging mode, one or more power cells may transmit a power supply to a power outlet, inverter, converter, power receiving system, or any combination thereof. In a discharging mode, one or more power cells may transmit a power supply to a motor, generator, or both. Preferably, the power cells which transmit a power supply to a power outlet, inverter, converter, or any combination thereof are not the same as the power cells which transmit a power supply to a motor or generator.

The one or more power cells may be prevented from reaching a certain depletion level while in the discharging mode. A depletion level limit may function to allow the one or more power cells to have sufficient energy stored to send a power supply to one or more components. A depletion level limit may allow one of the alternating power cells to transmit a power supply to the dedicated battery cell. A depletion level limit may allow a power cell to have energy remain such that when it changes from a resting or charging mode to a discharging mode, there is sufficient energy in the power cell to send a power supply. For example, when the power supply charging system is activated (e.g., powered on), a power cell which is then activated into the discharging mode has sufficient energy stored. Sufficient energy stored may include sufficient energy to send a power supply to the dedicated power cell to then send to the generator. Sufficient energy stored may include sending a power supply to a power receiving system. A depletion level limit may be sensed by one or more sensing devices. For example, a timer controller may determine an amount of time a power cell has been discharging or a sensing device in communication with one or more modules may determine an amount of energy remaining within a power cell.

One or more power cells have a resting mode. The resting mode may function to enable one or more cells to be free from receiving or transmitting a power supply, to retain a power supply, or both. One or more power cells may be adapted to maintain a generally constant power supply while in the resting mode. In the resting mode, one or more power cells may not supply power to any components of the power supply charging system. In the resting mode, one or more power cells may not supply power to a power outlet, inverter, converter, power receiving system, or any combination thereof. In the resting mode, one or more power cells may not receive a power supply. In the resting mode, the one or more power cells may not receive a power supply from the generator. In the resting mode, the one or more power cells may be free from being charged or from discharging.

The power supply charging system includes a generator. The generator may function to convert mechanical energy to electrical energy, transmit a power supply to charge one or more power cells, charge a plurality of power cells in an alternating fashion, or any combination thereof. The generator may function to cooperate with a motor to convert a frequency, voltage, and/or phase of power, or any combination thereof. The generator may be in electrical communication with one or more components of the power supply charging system. Electrical communication may include a direct or indirect electrical connection to the one or more components. The one or more components may include any component of the power supply charging system. The one or more components may include one or more of the power cells, a motor, a control system, relays, shunts, shaft couplings, busbars, or any combination thereof. The generator may be directly electrically connected to one or more relays, meter shunts, motors, shaft couplings, or any combination thereof. The generator may be mechanically connected to a motor, a shaft coupling, or both. The generator may be adapted to operably switch between providing power between a plurality of power cells. The generator may be adapted to operably switch between providing power to a first power cell, a second power cell, or even more additional power cells. A control system may cooperate with the generator to operably switch which power cell the generator transmits power to. The generator may transmit a power supply to a plurality of power cells to charge the power cells. The generator may be adapted to charge a first power cell, second power cell, or even more additional power cells. The generator may be adapted to charge a power cell only when a power cell in in charging mode. A control system may cooperate with the generator so that the generator charges a power cell when in a charging mode.

The generator may be any generator capable of receiving an electric or mechanical power supply and outputting an electric power supply. The generator may be alternating current generator or direct current generator. The generator may be a shunt, series, or compound wound generator. The generator may be a three-phase generator. The generator may be connected to a motor. An exemplary suitable generator may be a motor driven generator. An exemplary suitable generator may be an alternator, such as a magnet alternator. The generator may generate a 3-phase alternating current. The generator may include a rectifier to convert alternating current to direct current. A suitable generator may include a 12V Direct Current Permanent Magnet Alternator, such as WindZilla sold by GreenergyStar. A 12V Direct Current Permanent Magnet Alternator may be suitable for providing a power supply to a plurality of mobile devices while also charging a plurality of power cells in an alternating fashion.

The generator is powered by a separate power cell (i.e., dedicated power cell) as the one or more power cells to which the generator transmits power. The generator receives power from a power cell which it is not charged directly by the generator. The generator may be powered by a power cell which receives a power supply from a separate power cell while in a discharging mode. The generator may only supply power to a plurality of power cells. The generator may be free of supplying power to any components of power supply charging system separate from the plurality of power cells. The generator may be incapable of supplying power directly to one or more power inverters.

The generator may include, be in communication with, and/or be driven by a motor. The motor may function to receive a power supply from one or more power cells, converting electrical energy to mechanical energy, transmit mechanical energy to a shaft coupling and/or generator, or any combination thereof. The motor may function to transmit a power supply from one or more power cells to the generator. The motor may function to cooperate with the generator to convert a frequency, voltage, and/or phase of power, or any combination thereof. The motor may cooperate with one or more power cells, shaft couplings, generator, or any combination thereof to multiply a power supply received by the motor. The motor may be in electrical communication with one or more components. The one or more components may include any components of the power supply charging system. Electrical communication may be indirect or directly electrically connected to one or more of the components. The motor may be in direct or indirect electrical communication with one or more of a power switch, motor speed controller, relay, shaft coupling, generator, thermal coupler, fan, busbar, power junction, or any combination thereof. The motor may be mechanically connected to one or more components of the power supply charging system. The motor may be connected to a shaft coupling, generator, or both. The motor may be in electrical communication with one or more power cells. One or more power cells may supply power to the motor. The one or more power cells are separate from the one or more power cells which the generator charges (i.e., provides a power supply to). The one or more power cells may include one or more batteries. For instance, a third power cell may supply power to the motor. The motor may be in communication with the generator. The motor may drive the generator. The motor may drive the generator via one or more shaft couplings. The motor may be distinct from the generator or may be integrated with the generator as a single-piece unit. The motor may be an electric motor. The motor combined with the generator may be a dynamotor. The motor may be a single-phase motor. The motor may be a continuous speed direct current motor. A suitable exemplary motor may include a 24V 1.5 Hp 1800 RPM Fan Cool Continuous Duty DC Motor. Another suitable exemplary motor may include a 24V electric motor. The 24V electric motor may have a peak horsepower between about 1 HP and about 4.5 HP. The 24V electric motor may have a rotations per minute between about 4500 and 6900. For example, another suitable exemplary motor may include the E30-150 electric motor manufactured by AmpFlow, which is a division of Powerhouse Engineering Inc.

The motor may include or be connected with a motor speed controller. The motor speed controller may function to control the speed of a motor. The motor speed controller may be any controller which is able to control a speed of a motor. The motor speed controller may be in electrical communication with one or more components of the power supply charging system. Electrical communication may include direct or indirectly electrically connected to the one or more components. The motor speed controller may electrically connected to one or more of a power supply, power switch, current limit control, relay, motor, fan, thermocouple, or any combination thereof. The motor speed controller may start, increase the speed, decrease the speed, and/or stop the motor. The motor speed controller may start and/or increase the speed of the motor upon powering the system on via a power switch, via a signal from one or more sensing devices or controllers, or both. The motor speed controller may stop and/or decrease the speed of the motor upon powering the system off on via a power switch, via a signal from one or more sensing devices or controllers, or both. A motor may be sized suitable for a selected power receiving system. For example, if the system is intended to provide a power supply to a power receiving system comprising a plurality of mobile devices, the motor speed controller may be compact pulse-width modulation speed controller. An exemplary motor may be suitable for a working voltage of about 10-50V of direct current. An exemplary speed controller may include a Mini 10-50V 60A 3000W DC Motor Speed Control.

The motor may be connected to a temperature sensor. The temperature sensor may function to gauge a temperature of the motor while the power supply charging system is operating, transmit the temperate to one or more modules or controllers, or both. The temperature sensor may be in electrical communication with one or more components of the system. One or more components may include any components. Electrical communication may include direct or indirect electrical connection. The temperature sensor may be directly electrically connected with one or more of a motor, a fan, a motor speed controller, a busbar, a power junction, or any combination thereof. The temperature sensor may include a thermal protector, thermal coupler, thermometer, or any combination thereof. The temperature sensor may be a bimetal temperature switch thermostat. An exemplary temperature sensor is the KSD9700 bimetal temperature switch thermostat sold by Uxcell.

The power supply charging system may include one or more shaft couplings. The one or more shaft couplings may function to connect a motor with a generator, transfer a torque from a motor to a generator, multiply a torque, or any combination thereof. The shaft coupling may be any shaft coupling capable of provide these functions. The one or more shaft couplings may be connected to one or more other shaft couplings, a motor, a generator, or any combination thereof. Exemplary shaft couplings may include one or more gears, pulleys, the like or any combination thereof. One or more gears may include gears with one or more stages, epicyclical gear systems (ex: planetary gears), the like, or any combination thereof.

The power supply charging system may include a power converter. The power converter may function to convert a voltage of an incoming current to a different voltage for an outgoing current. The power converter may reduce an incoming direct current voltage. The power converter may be in electrical communication with one or more power cells, one or more power outlets, one or more inverters, a control system, one or more busbars, or any combination thereof. The power converter may receive a power supply from one or more of the plurality of power cells. The power converter may receive a power supply from either the first power cell or the second power cell. The power converter may receive a power supply from a power cell when in a discharging mode. The power converter may receive a power supply from a first power cell, a second power cell, or both. The power converter may receive a power supply from a first power cell, a second power cell, or both when in a discharging mode. The power converter may be a direct current to direct current converter, a voltage regulator, a linear regulator, or any combination thereof. The power converter may be any type of converter able to change an incoming voltage.

The power converter may be a voltage converter. The power converter may be a direct current to direct current converter. The power converter may reduce a direct current voltage. The direct current voltage may be received from one or more power cells. The power converter may be used to supply a standard direct current voltage useful (i.e., standard) in facility or equipment. For example, the power converter may supply a 12V direct current. A 12V direct current may be particularly useful for powering high efficiency direct current lighting and home electronics (i.e., portable fans, portable computers, portable communications devices, etc). The power inverter may be adapted to receive a 24V direct current. The 24V direct current may be provided by one or more of the power cells (i.e., first power cell, second power cell). The power converter may be a 24V to 12V power converter, a 12V to 5V power converter, or a combination thereof. The power converter may include a single power converter or a plurality of power converters. A plurality of power converters may be distributed throughout the power supply charging system. The power converter may be in electrical communication with a power inverter. A suitable power converter may include a direct current to direct current converter module which converts 12V to 5V. A 12V to 5V power converter may be suitable for transmitting a power supply to one or more USB power outlets.

The power supply charging system may include a power inverter. The power inverter may function to transform a form of current to a different type of current. The power inverter may transform an incoming direct current into an outgoing alternating current. By providing an outgoing alternating current, the power supply charging system may be compatible with any facility, equipment, or device requiring alternating current. The power inverter may be in electrical communication with one or more components of the power supply charging system. Electrical communication be directly or indirectly electrically connected. The power inverter may be in electrical communication with one or more power cells, one or more power outlets, one or more converters, one or more power outputs, a control system, or any combination thereof. The power inverter may be electrically connected to one or more breakers, one or more busbars, or both. The power inverter may receive a power supply from a power cell when in a discharging mode. The power inverter may receive power supply from a first power cell, a second power cell, or both. The power inverter may receive a power supply from a first power cell, a second power cell, or both when in a discharging mode. The power inverter may be sized to meet the direct current provided by one or more power cells. The power inverter may be suitable for receiving about 12V or greater direct current, about 24V or greater direct current, about 48V or greater direct current, about 500V or greater direct current, or even a greater amount of direct current. The power inverter may include a single power inverter or a plurality of power inverters. The power inverter may be a direct current to alternating current inverter. The power inverter may be suitable for transforming an incoming current to an alternating current. The alternating current may be about 110V or greater, about 220V or greater, or even more. A suitable power inverter may include a 600 W continuous power inverter. An exemplary inverter is a 600 Watt Pure Sine Wave Inverter which converts 12V direct current to 120V alternating current.

The power supply charging system may include one or more power outputs. The power outputs may function to connect the power supply charging system to a power receiving system and allow a power supply of the power supply charging system to be transmitted to the power receiving system. The one or more power outputs may be in electrical communication with one or more power cells, one or more power inverters, one or more power converters, a control system, or any combination thereof. The one or more power outputs may have any size or configuration to transfer a power supply from the power supply charging system to a power receiving system. The one or more power outputs may include an electrical connector, an electrical socket, an electrical box, or any combination thereof. An electrical connector may allow the one or more power outputs to connect the power supply charging system to a building, home, equipment, facility, or the like. Exemplary suitable electrical connectors may include a 110V electrical connector, 220V electrical connector, or both. The one or more power outputs may include a shore power adapter, plug, outlet, the like, or any combination thereof. The one or more power outputs may include one or more USB outlets and/or other mobile device outlets. The one or more power outputs may allow the power supply charging system to connect to a portable application. A portable application may include a land-based vehicles (e.g., campers, recreational vehicle (RV), large trucks, tour buses, the like), watercraft, onboard an aircraft, the like, or any combination thereof. A shore power adapter may be adapted for providing a continuous current. The current may be about 15 A or greater, 30 A or greater, 50 A or greater, or even more. One or more power outputs may transmit an alternating current, a direct current, or both. One or more power outputs may be dedicated to providing an alternating current. One or more power outputs may be dedicated to providing a direct current.

The power supply charging system includes a control system. The control system may function to determine an electrical current mode of one or more power cells, change an electrical current mode of one or more power cells, direct the generator to provide power to a specific power cell, direct an alternative energy source to provide power to a power cell, or any combination thereof. The control system may include any one or more components which may function to determine and/or change an electrical current mode of a power cell, direct a generator to provide or limit a power supply to a power cell, or any combination thereof. The control system may include a power cell managing module, a charge control module, one or more sensing devices, one or more interfaces, one or more relays, one or more busses, or any combination thereof. Suitable modules for a power cell managing module, charge control module, or both may include one or more processors, controllers, microprocessors, microcontrollers, or any combination thereof. The modules may be programmed to determine one or more pre-determined conditions of one or more power cells, such as a power cell which is discharging and/or charging. Upon the one or more modules receiving feedback one or more power cells has reached one or more pre-determined conditions, the one or more modules may initiate one or more rules to start flow, stop flow, continue flow, or any combination thereof of a power supply to and/or from one or more power cells. Suitable modules for the power cell managing module, the charge control module, or both may include a 12 Volt 10,000 Watt Digital Charge Controller as sold by Mountain Wind Trading Co and/or a 900 W direct current to direct current boost module, such as the KKMoon 900 W Digital Control DC-DC Boost Module sold on Amazon®.

The control system includes a power cell managing module. The power cell managing module may function to direct a generator to provide a power supply to a specific power cell. The power cell module may be adapted to alternate the generator to operably switch or alternate providing power to individual power cells. The power cell module may be adapted to alternate the generator to operably switch between providing power to a first power cell to a second power cell. The power cell module may be adapted to alternate the generator to provide a power to a power cell in a charging mode. The power cell module may direct the generator to provide a power supply to a power cell based on an occurrence of a pre-determined condition. The power cell module may include or be connected with one or more relays, one or more interfaces, one or more busses, one or more sensing devices, one or more power cells, or any combination thereof.

The control system includes a charge control module. The charge control module may function to detect an occurrence of a pre-determined power supply condition, activate the generator to supply power to a power cell, or both. The charge control module may be adapted to activate a generator to provide power to a power cell. The charge control module may be adapted to activate a generator to provide power to a power cell in a charging mode or a resting mode. The charge control module may be adapted to activate the generator based on an occurrence of a pre-determined power supply condition. The charge control module may be adapted to detect an occurrence of a pre-determined power supply condition in one or more power cells. The charge control module may include one or more relays, one or more interfaces, one or more busses, one or more sensing devices, or any combination thereof. The charge control module may be in electrical communication with the power cell module. The charge control module may share components with the power cell module. The charge control module may share one or more sensing devices with the power cell module or may include one or more sensing devices separate from the power cell module.

The control system may include one or more sensing devices. The one or more sensing devices may function to sense the presence occurrence of one or more pre-determined conditions, one or more pre-determined power supply conditions, or both. The one or more pre-determined conditions, one or more pre-determined power supply conditions, or both may be one or more conditions in a power cell. The one or more pre-determined conditions may be the same or different as the one or more pre-determined power supply conditions. The one or more pre-determined conditions, one or more pre-determined power supply conditions, or both may include a duration of time, a temperature, a voltage, a current, a draw, a percent depleted, a percent full, a time to depletion, a draw, the like, or any combination thereof.

One or more sensing devices may include a timer controller. A timer controller may function to determine a duration of time a power cell has been discharging or charging, relay a duration of time to one or more modules of a control system, prevent and/or allow a power supply to one or more power cells upon a pre-determined condition and/or upon a pre-determined supply condition, or any combination thereof. A timer controller may be programmed with a pre-determined condition and/or a pre-determined supply condition. The pre-determined condition and/or supply condition may be a suitable time a power cell is able to discharge or be in a discharging mode. A timer controller may be in electrical communication with one or more components of the system. Electrical communication may be direct or indirect electrical connection. One or more components may include one or more busbars, one or more switches, one or more modules, one or more power cells, one or more relays, the like, or any combination thereof. A timer controller may include a programmable relay cycle timer module. For example, a suitable timer controller may be the Programmable 12V Relay Cycle Timer Module under the brand name LeaningTech as sold on Amazon®. The timer controller may be programmed for a pre-set duration depending on the power needs of the power receiving system. For example, if the power receiving system is a plurality of mobile devices, the pre-set duration may be five minute intervals. At five minutes, the timer controller may prevent discharging of one or more power cells and allow charging of one or more power cells.

The power supply charging system may include one or more relays (i.e., relay switches). The one or more relays may function to control a power supply of one or more components of the power supply charging system. The one or more relays may control if a component transmits a power supply (i.e., electrical signal) to another component. The one or more relays may be in electrical communication with one or more sensing devices, busbars, power cells, generator, controllers, modules, the like, or any combination thereof. One or more sensing devices may activate a relay. The one or more relays may include any type of relay suitable for alternating, preventing, and/or allowing a power supply (i.e., electrical signal) to be transmitted from one component to another component of the power supply charging system. The one or more relays may include mechanical relays, electromechanical relays, electric relays, electromagnetic relays, static relays, or any combination thereof. Exemplary suitable relays may include a solid state relay, electromagnetic relay, a latching relay, a reed relay, a polarized relay, the like, or any combination thereof. One or more of the relays may be two-pole relays, four-pole relays, or both. The one or more relays may include a plurality of relays. The plurality of relays may include a first relay, a second relay, a third relay, a fourth relay, a fifth relay, or any combination thereof. The plurality of relays may control a power supply to specific components of the power supply charging system. Exemplary suitable relays suitable for one or more of the plurality of relays include: a 12 volt 440 amp diversion/disconnect charge controller, such as that sold by Missouri Wind and Solar via eBay®; a direct current 12 volt 30 amp multifunction adjustable delay timer relay on/off module such as that sold on eBay®; general purpose relay Part No. 528-784XDXM4L-12D sold by Mouser Electronics; general purpose power relay 8-pin Model No. JQX-12F 2Z sold by Uxcell®.

A first relay may be synonymous with a generator relay. The generator relay may be electrically connected with one or more of a generator, generator head, diode, busbars, or any combination thereof. The generator relay may control power supply from a generator or generator head to one or more components of the system. The one or more components may include one or more of a meter shunt, busbar, relay, plurality of power cells, or any combination thereof.

A second relay may be synonymous with a motor relay. The motor relay may control power supply from a power cell to a motor, a motor speed controller to a motor, or both. The motor relay may interrupt or allow power supply to a motor such that the motor is turned on or off. The motor relay may be electrically connected with one or more of a motor speed controller, current limit control, power switch, power cell, busbar, power cell managing module, charge control module, motor, or any combination thereof.

A third relay may be synonymous with a power cell relay. The power cell relay may control power supply to one or more power cells. The power cell relay may interrupt or allow flow of the power supply to one or more power cells. By allowing flow of power supply to one or more power cells, the power cell relay may allow the power cell to be actively charged. The power cell relay may be electrically connected with one or more busbars, power cells, or both, meter shunts, generator, or any combination thereof. The power cell relay may be a two-pole or four-pole relay. An exemplary suitable power cell relay may be a four-pole miniature relay.

A fourth relay may be synonymous with a main power relay. The main power relay may control transmission of power from one or more power cells to one or more converters and/or outlets. The main power relay may be in communication with one or more sensing devices, such as a timer control. The main power relay may prevent flow of a power supply from one or more power cells upon reaching a pre-determined condition, such as duration of time discharging. The main power relay may be electrically connected with one or more power cells, one or more busbars, one or more power switches, or any combination thereof.

A fifth relay may be referred to as an indicator relay. The indicator relay may control transmission of power from one or more power cells to one or more indicators on a housing of the system. The indicator relay may be in electrical communication with one or more status indicators, one or more busbars, one or more power cells, one or more switches, or any combination thereof.

The power supply charging system may include one or more interface modules. The one or more interface modules may cooperate with one or more relays, one or more sensing devices, or both. The one or more interface modules may function to direct a relay to allow or prevent an electrical signal to one or more components. The one or more interface modules may be electro-mechanical or electrical. The one or more interfaces may be a single relay, a plurality of relays, or a modular module.

The power supply charging system may include one or more busbars. The one or more busbars may function to receive a plurality of incoming electrical connections and provide a reduced number of outgoing electrical connections. The one or more busbars may be in electrical communication with any component which receives is in electrical communication with multiple components. The one or more busbars may be in electrical communication with one or more relays, one or more sensing devices, one or more meters, one or more power cells, one or more thermal controls, any other component of the power supply charging system, or any combination thereof. The one or more busbars may be part of the control system. The busbar may include a strip, bar, tube, or combination thereof. The busbar may be comprised of any electrical conducting material. The busbar may be comprised of a metal. Suitable metals may include copper, brass, aluminum, the like, or any combination thereof. One or more busbars may include one or more trigger busbars, power cell busbars, auxiliary power busbars, main power busbar, sensing busbar, or any combination thereof.

The power supply charging system may include one or more user interfaces. The one or more user interfaces may allow a user to determine a status of the power supply charging system, select an operation of the power supply charging system, or both. The one or more user interfaces may provide a status of one or more components of the power supply charging system. The status may include a percent charged or discharged of one or more power cells; the operating temperatures of different component; a voltage, a current, a resistance in the power supply charging system; a life span or remaining life span of one or more components, system errors, maintenance reminders, the like, or any combination thereof. The one or more user interfaces may allow a user to select an operation of the power supply charging system. The one or more user interfaces may allow a user to power the system on and/or off; manually select a power cell for charging, discharging, or resting; may allow a user to step through a troubleshooting routing; the like, or any combination thereof. The one or more user interfaces may include one or more screens, one or more lights, one or more panels which relay information to a user, the like, or any combination thereof. One or more user interfaces may include one or more one more status light indicators, amp usage meter displays, battery monitor meters displays, the like, or any combination thereof.

The power supply charging system may include one or more meters. The one or more meters may function to measure and display one or more values of a power supply (i.e., electrical current) located in the power supply charging system. The one or more meters may function to measure and display a voltage, current, resistance, any other properties of the power supply charging system, the like, or any combination thereof. The one or more meters may be located between any component of the power supply charging system and another component of the power supply charging system. The one or more meters may be electrically connected to a component being measured either directly or indirectly. One or more meters may be electrically connected to one or more power cells, one or more meter shunts, one or more diodes, one or more relays, one or more busbars, a generator, or any combination thereof. Exemplary suitable meters and meter displays may include the Bayite DC 6.5-100V 0-100A LCD Display which is a current, voltage, and power energy meter; a battery capacity tester, such as the DROK DC8-63V LCD Battery Capacity Tester having a gauge panel with battery status indicator.

The power supply charging system may include one or more thermal controls. The one or more thermal controls may function to control a temperature of one or more components of the power supply charging system. The one or more thermal controls may function to maintain one or more components cool, maintaining one or more components at an acceptable operating temperature, prevent overheating, or any combination thereof. The one or more thermal controls may be any device suitable for maintaining one or more components at an operating temperature, prevent overheating, or both. The one or more thermal controls may include one or more fans, one or more thermometers, the like, or both.

The power supply charging system may include one or more housing units. The one or more housing units may function to house one or more components of the power supply charging system. The one or more housing units may enclose one or more of the components in a single housing unit or a plurality of housing units. The one or more housing units may include one or more vents. The one or more vents may allow air to flow through the one or more housing units. Air flow through the one or more housing units may maintain one or more components of the power supply charging system at an acceptable operating temperature, prevent overheating, or both. The one or more power cells may be housed together with or separate from other components of the power supply charging system. The control system may be housed together with or separate from other components of the power supply charging system.

The power supply charging system may include one or more switches. One or more switches may function to allow a user to power the system on and/or off, prevent a power supply to a specific component of the system, select a power cell to charge and/or discharge, the like, or any combination thereof. The one or more switches may be integrated anywhere in the system to allow a user to power the system on and/or off, prevent a power supply to a specific component of the system, select a power cell to charge and/or discharge, the like, or any combination thereof. The one or more switches may include a power switch. The power switch may be located in electrical communication with the generator. Powering the generator off may result in the entire power supply charging system being powered off and powering the generator on may result in the entire power supply charging system being powered on.

The power supply charging system may include one or more breakers. The one or more breakers may function to protect the power supply charging system. The one or more or more breakers may interrupt current flow if there is excess current in the system, such as from an overload or short circuit. The one or more breakers may be connected to any component of the system where a current may be interrupted to prevent damage to the system. One or more breakers may be in electrical communication with one or more of a power inverter, busbar, relay, power cells, or any combination thereof. One or more breakers may be directly electrically connected to a power invert, busbar, or both.

The power supply charging system may include one or more one-way rectifiers. A one-way rectifier may prevent flow of electrical current in one direction, allow flow of electrical current in an opposing direction, or both. A one-way rectifier may be electrically connected between any two components of the system where electrical current is desired to be limited in flow-direction. A one-way rectifier may be electrically connected between one or more power cells and one or more components of a charge control system. A one-way rectifier may be electrically connected to both a charge control module and a third power cell. A one-way rectifier may be a diode, such as a blocking diode.

The power supply charging system may include one or more capacitors. The one or more capacitors may be used to store or dissipate electrical energy. The capacitors may function to allow busbars to function properly, such as by eliminating chatter of electrical connections at the busbars. One or more of the busbars may be connected to a capacitors. For example, one or more trigger busbars may be connected to one or more capacitors.

The power supply charging system may include one or more shunts. The one or more shunts may provide a low resistance path. The low resistance path may allow electrical current to be directed toward a different electrical path. The one or more shunts may be in electrical communication with any components where an alternate electrical path is desired. One or more shunts may be electrically connected to one or more meters, such as an amp usage meter; one or more busbars; one or more generators; or any combination thereof.

The power supply charging system may include one or more current limit controls. A current limit control may function to limit the amount of current flowing through the system. The one or more current limit controls may be in communication with one or more components of the device which provide current to the system. The one or more current limit controls may be electrically connected to one or more motor speed controllers, power switches, motors, relays, power cells, or any combination thereof.

The present disclosure relates to a method of install, operating and using a power supply charging system.

The method may include installing the power supply charging system into a facility. By installing the power supply charging system into a facility, the system may be available for transmitting a power supply to the facility at any given time. The power supply charging system may be used in case of an emergency, such as during a power outage. The power supply charging system may be used continuously as the main power supply for the facility. To install the power supply charging system into the facility, the facility may have to be adapted to be compatible with the system. The facility may need to be first provided with an electrical sub-panel, a transfer switch, or both. The electrical sub-panel, transfer switch, or both may be near and/or in electrical communication with a main electrical panel of the facility.

The method may include connecting the power supply charging system to a power receiving system. Connecting the power supply charging system may include connecting one or more power outputs of the power supply charging system to one or more outlets of one or more power receiving systems. Connecting the power supply charging system may include connecting one or more power connectors of a power receiving system to one or more power outputs of the power supply charging system.

The method may include activating the power supply charging system. Activating the system may allow the system to provide a power supply to a power receiving system. Activating the power supply charging system may include connecting the power supply to a power receiving system. Activating the power supply may include moving a switch from one position (i.e., off) to another position (i.e., on).

The method may include charging a power cell (i.e., dedicated power cell) which sends power to a motor and/or generator. By charging the power cell, the power cell has sufficient energy to then supply power to the motor and/or generator. The power cell may receive a power supply from a power cell in a discharging mode. The power cell then transmits the power supply to the generator.

The method may include transmitting a power supply to a generator. By supplying power to the generator, the generator is able to transmit a power supply (i.e., charge) a power cell in a charging mode. The generator may receive a power supply or energy from a motor, shaft coupling, or both. The motor may receive a power supply from a power cell. The power cell may be a dedicated power cell which is not in a charging, discharging, or resting mode and charged by the generator. The motor may receive a power supply as electrical energy. The motor may convert the electrical energy into mechanical energy. The mechanical energy may be torque. The mechanical energy may be transferred from the motor to one or more shaft couplings. The one or more shaft couplings may transfer the torque to a generator head. The one or more shaft couplings may multiply torque or other mechanical energy. The one or more shaft couplings may transfer a greater amount of torque or other mechanical energy than received by the motor. The generator may then charge a power cell. The generator may output a greater amount of power supply than received from the motor. The power supply may be multiplied via the one or more shaft couplings between the motor and generator.

The method may include charging a power cell in a charging mode. By charging the power cell, the power cell may then have a sufficient power supply to be used as a power supply when in a discharging mode. The power cell may receive a power supply from a generator, alternative energy source, or both. The power cell may cooperate with the power cell managing module, the charge control module, or both to receive a power supply. The generator may cooperate with a power cell managing module, a charge control module, or both to transmit a power supply to the power cell. The power cell managing module may direct the generator to a specific power cell for charging. The power cell managing module may direct the generator to a power cell in a charging mode. The power cell managing module may direct the generator based on an occurrence of a pre-determined condition. The pre-determined condition may be sensed by one or more sensing devices. The charge control module may be adapted to detect an occurrence of a pre-determined power supply condition in a power cell. The charge control module may be adapted to detect the occurrence while a power cell is in a charging or resting mode. The charge control module may activate the generator provide power to a power cell in a charging or resting mode.

The method may include discharging a power cell in a discharging mode. By discharging a power cell, the power cell may then send power to a power receiving system, another power cell, or both. The power cell may transmit power to one or more inverters, converters, or both. The power cell may transmit power to a power receiving system. The power cell may transmit power to another power cell. The other power cell may be a dedicated power cell which only charges the generator. The power cell may cooperate with the power cell managing module, the charge control module, or both. The power cell managing module may direct the generator to disconnect from a power cell when in a discharging mode.

The method may include switching a power cell in a charging mode to a discharging mode. Alternating the power cells in a charging mode and discharging mode may allow the system to generate a power supply, provide a continuous power supply, or both. The power cells, the generator, or both may be in communication with a control system. The control system may coordinate which power cell(s) are in a charging mode, discharging mode, and resting mode. A power cell managing module may cooperate with a generator, sensing devices, and one or more of the power cells. The power cell managing module may manage which cell receives power from the generator. A charge control module may cooperate with cooperate with a generator, sensing devices, and one or more of the power cells. The charge control module may manage the power supply output of the generator.

ILLUSTRATIVE EMBODIMENTS

The following descriptions of the Figures are provided to illustrate the teachings herein, but are not intended to limit the scope thereof. Features of any one embodiment may be employed in another. For example, any of the relays or busbars of FIG. 2 may be utilized in the system of FIG. 1.

FIG. 1 illustrates a power supply charging system 10. The power supply charging system 10 includes a first power cell 12. The first power cell 12 may include one or more batteries 14. The one or more batteries 14 may be connected in a series and parallel combination. The power supply charging system 10 includes a second power cell 16. The second power cell 16 may include one or more batteries 18. The one or more batteries 18 may be connected in a series and parallel combination. The first power cell 12 may be connected in parallel to the second power cell 16. Both the first power cell 12 and the second power cell 16 are in electrical communication with a generator 28. The generator 28 is able to alternatingly provide power to the first power cell 12 and the second power cell 16. The generator 28 provides power to the first power cell 12 or the second power cell 16 when either power cell is in a charging mode.

FIG. 1 further illustrates the generator 28 is in electrical communication with a third power cell 22. The third power cell 22 is adapted to operably supply power to the generator 28. The third power cell 22 may include one or more batteries 24. The third power cell 22 is in electrical communication with the first power cell 12 and the second power cell 16. When in a discharging mode, the first power cell 12 and/or the second power cell 16 supply power to the third power cell 22. The first power cell 12 and/or second power cell 16 are in communication with the third power cell 22 through a power converter 52a. The third power cell 22 is in electrical communication with an electric motor 26. The electric motor 26 supplies power to the generator head 20. The generator 28 is an electric motor driven generator. The motor 26 is connected to the generator head 20 via a shaft coupling 27 (not shown). The generator 28 may be in electrical communication with a power switch 55. The power switch 55 can be used to activate the power supply charging system 10. The power supply charging system 10 may include a user interface 53. The user interface may be part of the housing 57.

FIG. 1 illustrates generator 28 is in electrical communication with the first power cell 12 and the second power cell 16. The generator 28 may be in electrical communication the first and second power cell 12, 16 through a control system 30. The control system 30 includes a power cell managing module 32 and a charge control module 34. The charge control module 34 may reside in the same housing 57 as the generator 28. The power cell managing module 32 may be separate from the housing 57 of the generator 28. The power cell managing module 32 may include a first relay 36. The first relay 36 may be in electrical communication with both the first and second power cells 12, 16. The first relay 36 may also be in communication with a power inverter 38 and a power converter 52a, 52b.

FIG. 1 illustrates exemplary outputs of the power supply charging system 10. Through a power converter 52b, a direct current is received from the first and/or second power cell 12, 16. The power converter 52b is in electrical communication with an auxiliary power outlet 51. The auxiliary power outlet 51 may provide a direct current. The auxiliary power outlet 51 can be mounted on the same housing 57 as the generator 28. The power inverter 38 receives a direct current from the first and/or second power cell 12, 16. The power inverter 38 converts the direct current to an alternating current. The power inverter 38 is connected to an alternating power output 40. The power output 40 may be connected to a facility 42. The power output 40 may transmit an alternating current from the power inverter 38 to the facility 42. The power inverter 38 is also in electrical communication with a shore power outlet 50. The shore power outlet 50 may provide an alternating current. The shore power outlet 50 can be mounted on the same housing 57 as the generator 28. The power inverter 38 can also be in electrical communication with a power converter 52c. The power converter 52c receives an alternating current from the power inverter 38 and converts the current to direct current. The power converter 52c is in electrical communication with power output 41. Power output 41 may be connected to facility 42 or other devices. Power output 41 may transmit a direct current from the power converter 52c to the facility 42.

FIG. 1 further illustrates the first relay 36 may be in electrical communication with a sensing device 44. The sensing device 44 may be a timer controller 46. The timer controller 46 may be in electrical communication with a second relay 48. The second relay 48 may be in electrical communication with the generator 28. The first relay 36 may control which of the first or second power cell 12, 16 transmits a power supply to the power inverter 38. The first relay 36 may control which of the first or second power cell 12, 16 receives a power supply from the motor driven generator 28. The power cell managing module 32 may alternate the generator 28 to switch between providing power between the first and second power cell 12, 16. The second relay 34 may control activation of the motor driven generator 28. The charge control module 34 may detect a pre-determined power supply condition in the first or second power cell 12, 16 to activate the motor driven generator 28. The power cell managing module 32 and the charge control module 34 may both share the same sensing device 44. Alternatively, the power cell managing module 32 and the charge control module 34 may each have at least one dedicated sensing device 44 per each module.

Figure 2:
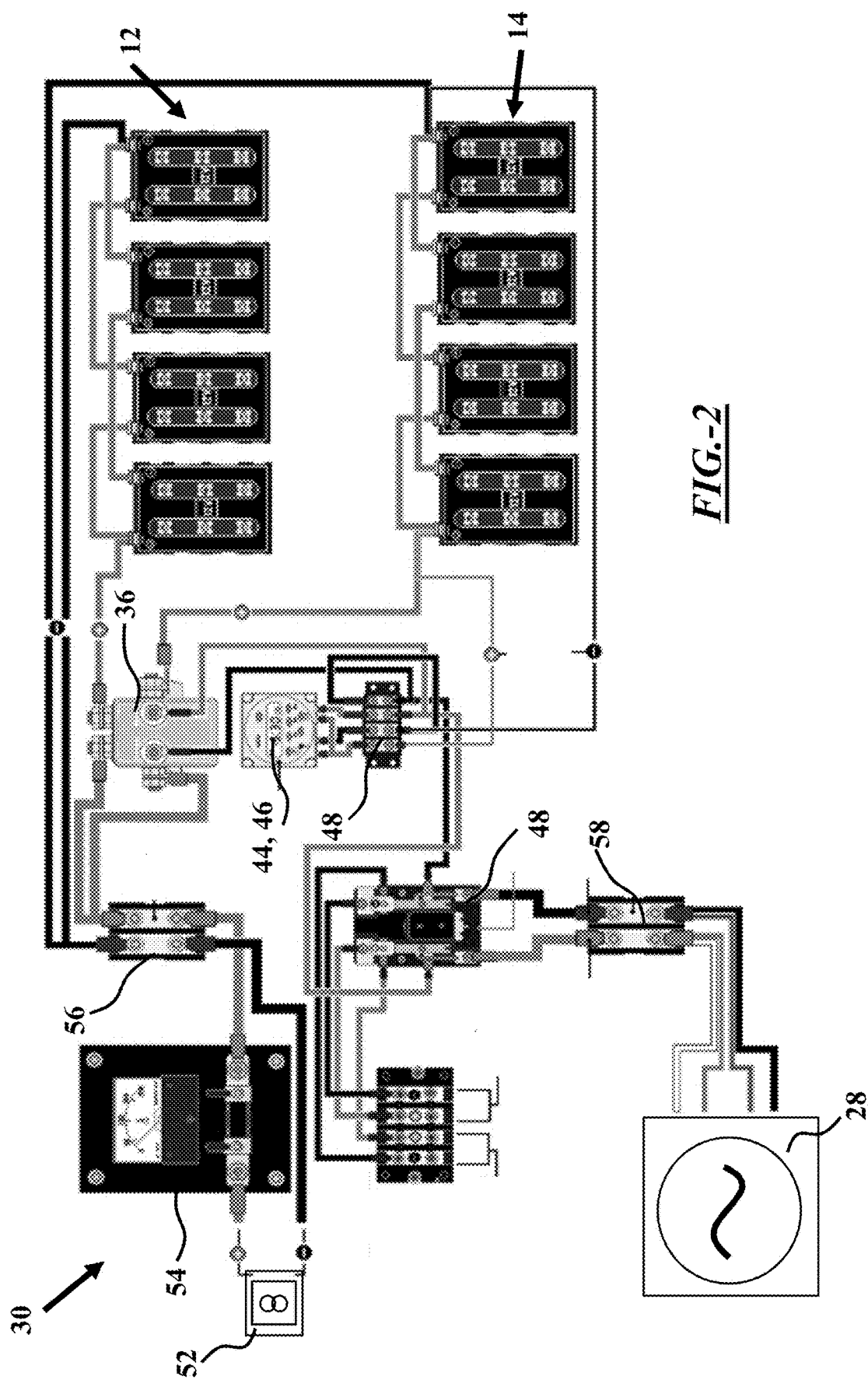
FIG. 2 illustrates a control system according to the teachings.

FIG. 2 illustrates an exemplary control system 30. The control system includes a first relay 36. The first relay 36 is part of the power cell managing module 32. The first relay 36 is in electrical communication with both the first power cell 12 and the second power cell 16. The first relay 36 may be a relay switch which controls which of the first power cell 12 and second power cell 16 transmit a power supply to an inverter 52. The first relay 36 is in electrical communication with an inverter 52. Between the first relay 36 and the inverter 52, there is an amp usage meter 54. The amp usage meter 54 measures the amps of the current being received by the inverter 52. Between the first relay 36 and the amp usage meter 54, there is a power cell buss 56. The power cell buss 56 is in electrical communication with the first power cell 12 and the second power cell 16 through the first relay 36. The first relay 36 is in electrical communication with the sensing device 44. The sensing device 44 is a timer 46. The first relay 36 may be in electrical communication to the sensing device 44 at a sensing device buss 58. The sensing device buss 58 is in electrical communication with the second relay 48. The second relay 48 is part of the charge control module 34. The second relay 48 is in electrical communication with the generator 28. An auxiliary buss 58 connects the second relay 48 to the generator 28.

FIG. 3 illustrates an exemplary process for generating power by the power supply charging system 10. The process may include activating 200 the power supply charging system 10. The power supply charging system 10 may first be activated by turning on a power switch 55. After activating the system 10, a power cell 12, 16 may be discharged 205. The power cell 12, 16 may be in a discharging mode. The power cell 12, 16 may be a power cell containing a sufficient charge to then subsequently discharge. In this example, the power cell may be the first power cell 12. The first power cell 12 upon discharging transmits power 210 to the dedicated power cell 22 and 215 into any of the power outlets 40, 41 50, 51. The dedicated power cell 22 transmits power upon being charged 220. The power supply is received by the motor driven generator 28. The motor driven generator 28 may be in communication with a charge control module 34. The charge control module 34 may detect the need for a power cell 12, 16 to be charged while the power cell 12, 16 is in a charging or rest mode 225. For example, as the first power cell 12 is in the discharging mode, the charge control module 34 may detect if the second power cell 16 is in need of a power supply (i.e., not fully charged). If the charge control module 34 detects the need for the power cell 12, 16 to be charged the motor driven generator 28 may transmit a power supply 230. The power supply may then charge the power cell 12, 16 which is in a charging mode. For example, as the first power cell 12 is in a discharging mode, the second power cell 16 may be in a charging mode. While the power cells 12, 16 are in opposing discharging and charging modes, the power cell managing module 32 may detect when the motor driven generator 28 needs to alternate the power supply 235. The power cell managing module 32 cooperates or has a sensing device 44 to sense a pre-determined condition. If the pre-determined condition is sensed, the power cell managing module 32 then directs the motor driven generator 28 to redirect the power supply 240. The generator 28 then provides a power supply to a different power cell 12, 16 which is now in a charging mode. In this example, as the first power cell 12 was initially in a discharging mode, the first power cell 12 is now in charging mode. After switching which power cell 12, 16 is in charging or discharging mode, the opposite power cell 12, 16 is now in a discharging mode to provide a power supply 245. The power cell 12, 16 in a discharging mode provides a power supply to the dedicated power cell 110 and to the facility 215. In this manner, the power cells 12, 16 are alternatingly charged by the motor driven generator 28 and provide a continuous power supply to the facility.

FIG. 4 illustrates a housing 57 of a power supply charging system 10. The housing 57 includes a front panel 112. The front panel 112 includes a user interface 53. The user interface 53 includes an amp usage meter 54 and a battery monitor meter 62. The front panel further 112 includes a power switch 55. The front panel includes a plurality of power outlets 104. The power outlets 104 include a plurality of USB outlets 134 and a plurality of 110V outlets 136. Via the power outlets 104, the system 10 is able to provide electrical current to a plurality of mobile devices 138, such as one or more laptops 140 and mobile phones 142. The front panel 112 an electronics power switch 76. The front panel 112 also includes a charging status display 90. The charging status display 90 includes a plurality of indicator lights 92. The plurality of indicator lights 92 include a system indicator light 94, a first power supply light 96, and a second power supply light 98. The system indicator light 94 is lit when the power supply charging system 10 is powered on and functioning. The first power supply light 96 when lit indicates the first power cell 12 is receiving a charge. The second power supply light 98 when lit indicates the second power cell 16 is receiving a charge.

FIG. 5 illustrates a rear panel 114 of a housing 57 of a power supply charging system 10. The rear panel 114 included a plurality of cooling fans 106. The rear panel includes a ground connector 132. The ground connector allows the system 10 to be grounded, such as by being connected to a ground spike (not shown). The rear panel 114 includes an auxiliary power outlet 51. The rear panel further includes a indicator light switch 100. The indicator light switch 100 allows power to be transmitted to the indicator lights 92 on the front panel 112.

Figure 6:
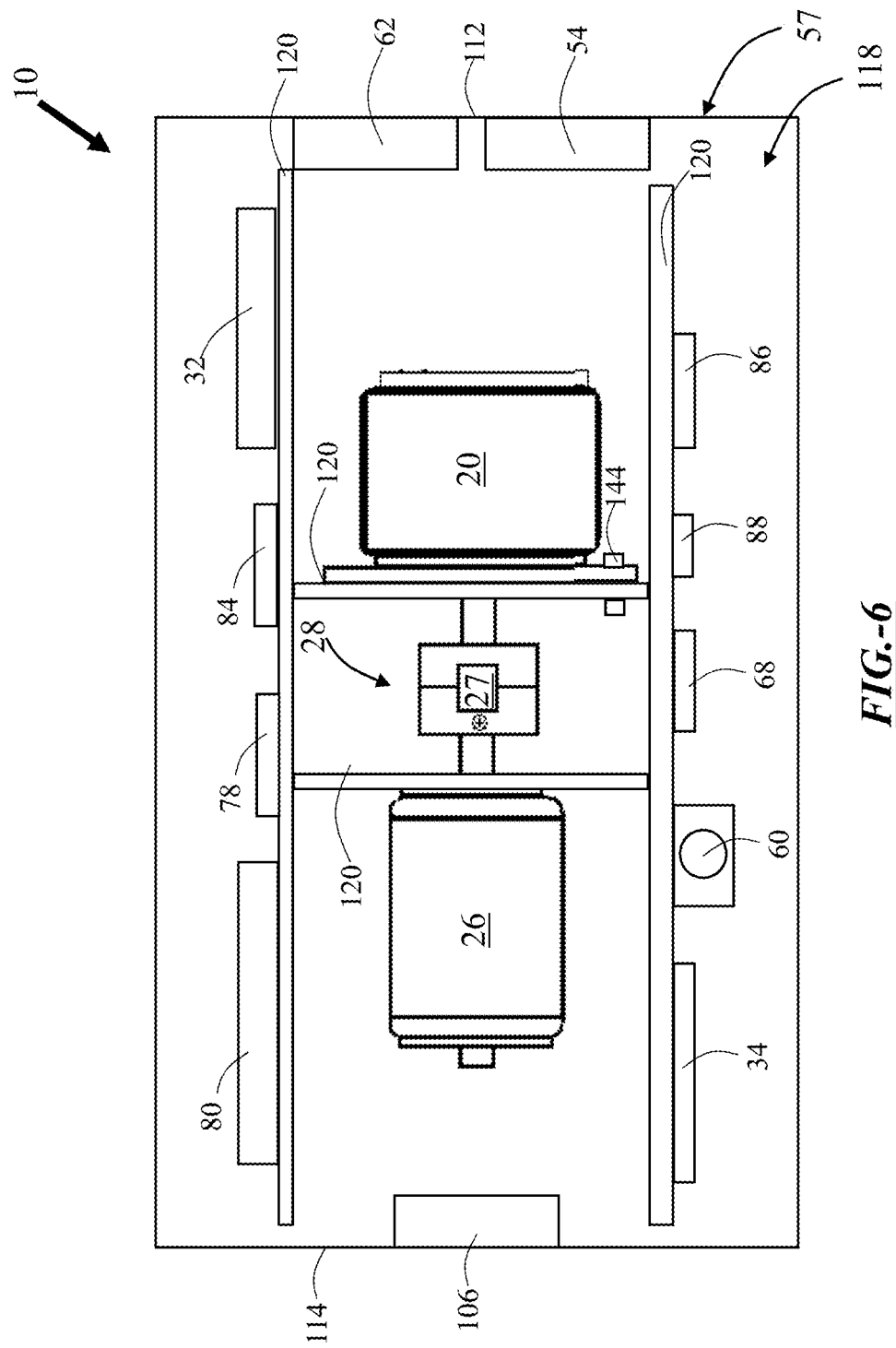
FIG. 6 illustrates an interior view of a top portion of an exemplary power supply charging system.

FIG. 6 illustrates a top view of an interior 118 of a housing 57. The housing 57 is of a power supply charging system 10 with a cover unit (not shown) removed. The power supply charging system 10 is sized to be mobile, such as to be located on a desktop, mobile office, construction site, in a vehicle, restaurant, etc. The system is able to power a plurality of mobile devices 138 (not shown) via first and second power cells 12, 16 (not shown) while either power supply discharges. The housing 57 includes a front panel 112 opposite a rear panel 114. Within the interior 118, interior support walls 120 extend along the length and width of the housing 57. Within the housing 57 is a generator 28. The generator 28 includes an electric motor 26 connected to a generator head 20 via a shaft coupling 27. The shaft coupling 27 may include a current, voltage, and/or torque multiplier. The generator head 20 is mounted to an interior support wall via a fastener 144. The power supply charging system 10 includes a cooling fan 106. The front panel 112 may include mounted thereon a battery monitor meter 62 and an amp usage meter 54.

FIGS. 7-8 illustrate opposing side views of an interior 118 of a housing 57. The housing 57 is that of a power supply charging system 10 with a cover unit (not shown) removed. The housing 57 includes a plurality of shelves 122 extending from the front panel 112 to the rear panel 114. Extending between or from shelves 122 there are interior support walls 120. Within the housing 57 is a first power cell 12 and a second power cell 16. The first power cell 12 includes one or more batteries 14. The second power cell 16 includes one or more batteries 18. The housing further includes a third power cell 22. The third power cell 22 includes one or more batteries 18. The dedicated power cell 22, first power cell 12, and second power cell 16 are held in place by one or more brackets 124. The brackets 124 extend from one shelf 122 to another shelf 122.

FIG. 7 further illustrates the power supply charging system 10 includes a charge control module 34 mounted to an interior support wall 120. The charge control module 34 is connected to a blocking diode 60. The wall 120 includes a pass through opening 128 to allow electrical connections to pass therethrough. The wall 120 further includes a timer controller 46. Adjacent to the timer controller 46 is are two auxiliary power busbars 68 and a sensing busbar 88. Part of an auxiliary busbar 68 is combined with the sensing busbar 88. Mounted on the wall 120 is a meter shunt 86. Mounted on the front panel 112 are an amp usage meter 54 and a charging status display 90. The system 10 further includes an inverter 38, a fifth relay 102, and a breaker 74. Mounted on the rear wall 114 is a cooling fan 106. Mounted on a support wall 120 and shelf 122 below the charge control module 34 is a pair of trigger busbars 66. The first trigger busbar 66a connected to the first and second relays 84, 78. The second trigger busbar 66b connected to the first, second, and third relays 64, 70, 102. Between the first and second trigger busbars 66a, 66b is a capacitor 126. Adjacent to the trigger busbars 66 are a third relay 64 and a fourth relay 70.

Figure 9:
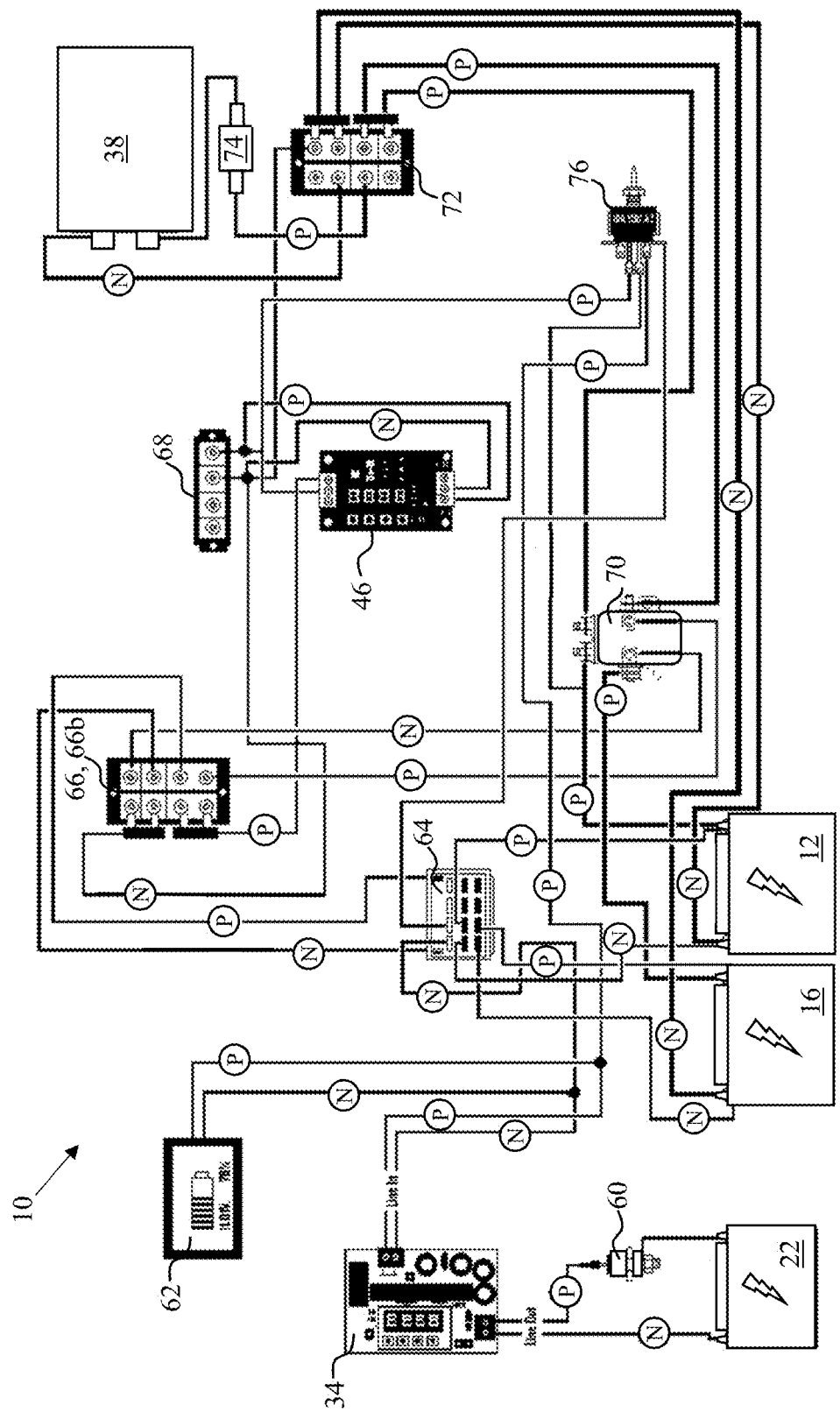
FIG. 9 illustrates electrical connections of an exemplary power supply charging system.

FIG. 9 illustrates wiring of the power supply charging system 10 to allow alternating charging and discharging of a first and second power cell 12, 16. The third power cell 22 has a positive connection P and a negative connection N to a charge control module 34. Between the charge control module 34 and the third power cell 22 is a blocking diode 60. The charge control module 34 has a positive connection P and negative connection N to a battery monitor meter 62. The battery monitor meter 62 is part of a user interface 53 of a housing 57 (not shown). The charge control module 34 is further connected via the positive connection P to the electronics power switch 76. The charge control module 34 is connected via the negative connection N to a third relay 64. The third relay 64 receives positive and negative connections P, N from both the first power cell 12 and second power cell 16. The third relay 64 is connected to a trigger busbar 66 via both a positive and negative connection P, N. The third relay 64 is also in electrical communication with the electronics power switch 76. The trigger buss 66 is in electrical communication with an auxiliary power busbar 68 via a negative connection N. The auxiliary busbar 68 is in electrical communication with a timer controller 46 and main power busbar 72 via negative connections N. The trigger busbar 66 is also connected to the timer controller 46 via a positive connection P. The timer controller 46 is further connected to the auxiliary power busbar 68 via a positive connection P. The auxiliary power busbar 68 and timer controller 46 are in electrical communication with the electronics power switch 76 via a positive connection P. The trigger busbar 66 is also in electrical communication with a fourth relay 70 via both positive and negative connections P, N. The fourth relay 70 is in connection via separate positive connections P with both the first power supply 14 and second power cell 16. The fourth relay 70 is also in electrical communication via two separate positive connections P with a main power busbar 72. The main power busbar 72 is in electrical communication via separate negative connections N with both the first power cell 12 and second power cell 16. The main power busbar 72 is in electrical communication with a power inverter 38 via a positive connection P with a breaker 74 located therebetween. The main power busbar 72 is also in electrical communication with the power inverter 38 via a negative connection N.

Figure 10:
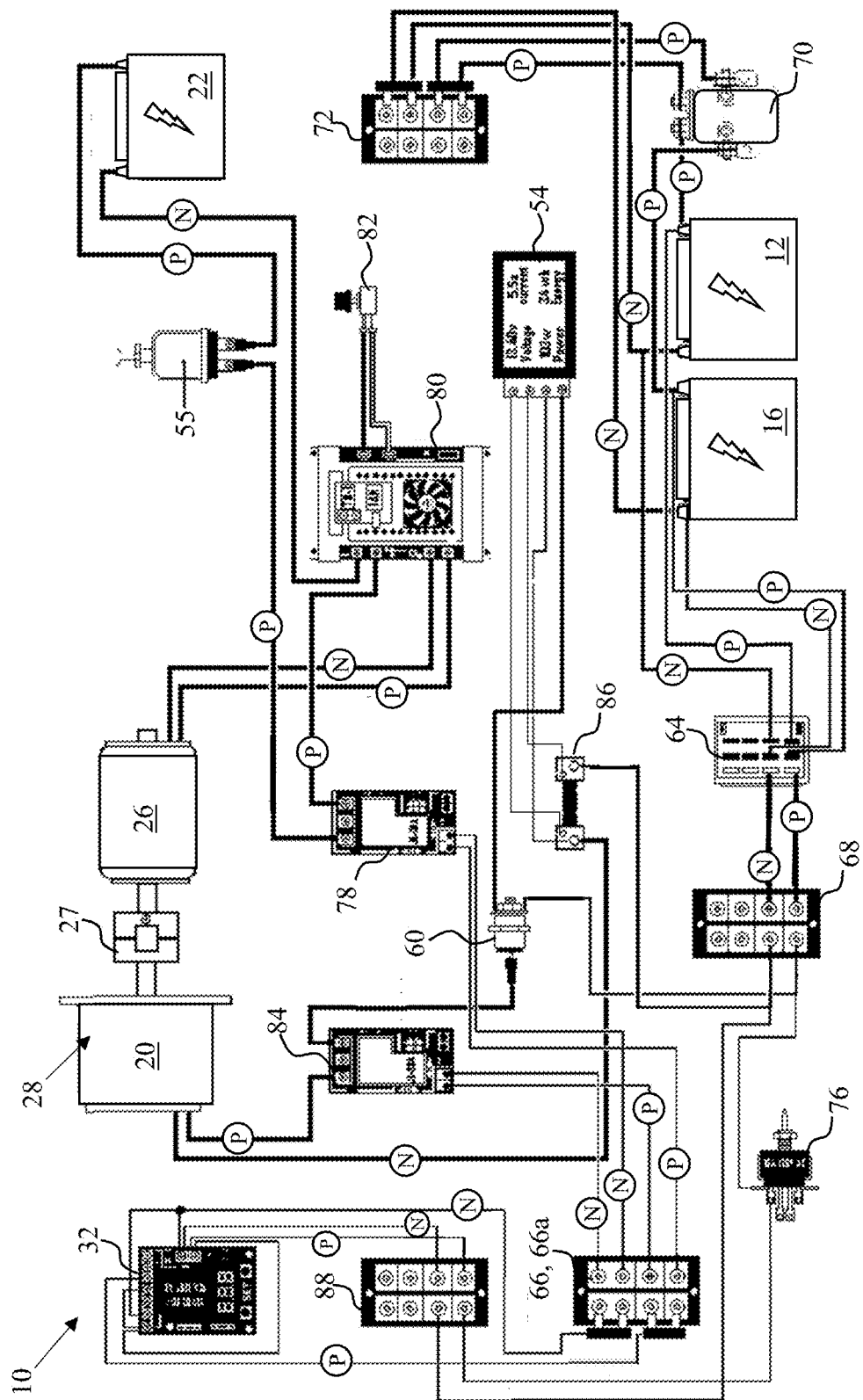
FIG. 10 illustrates electrical connections of an exemplary power supply charging system.

FIG. 10 illustrates an electrical schematic of a power supply charging system 10 so that a generator 28 is in electrical communication with a first and second power cell 12, 16 and a third power supply 22. The third power supply 22 is in electrical connection with the power switch 55 via a positive connection P. The power switch 55 is in electrical communication with a second relay 78 is in electrical communication with a motor speed controller 80, such as via a positive connection P. The third power cell 22 is also in connection with the motor speed controller 80 via a negative connection N. The motor speed controller 80 is electrically connected to a current limit control 82. The motor speed controller 80 is in further electrical communication with a motor 26 via both a positive and negative connection P, N. The motor 26 is coupled to a generator head 20 via a shaft coupling 27, thus forming a motor-driven generator 28. The generator head 20 is in connected to a first relay 84 via a positive connection P. The generator head 20 is in further connection with a meter shunt 86 via a negative connection N. The meter shunt 86 is in electrical communication with the auxiliary power busbar 68. The auxiliary power busbar 68 is in electrical communication with the electronics power switch 76. The auxiliary power busbar 68 is in further electrical communication with a sensing busbar 88. The electronics power switch 76 is also in electrical communication with the sensing busbar 88. The trigger busbar 66 is in electrical communication with the power cell managing module 32 via both a positive and negative connections P, N. The sensing busbar 86 is also in electrical communication with the power cell managing module 32 via both positive and negative connections P, N. The trigger busbar 66 is in electrical communication with a first relay 84 via both positive and negative connections P, N. The first relay 84 is in electrical communication with a blocking diode 60. The blocking diode 60 is in electrical communication with the auxiliary busbar 68. The blocking diode 60 is also in electrical communication with an amp usage meter 54. The amp usage meter 54 may be part of a user interface 53 (not shown). The amp usage meter 54 is in electrical communication with the meter shunt 86. The trigger busbar 66 is in further electrical communication via both positive and negative connections P, N with the second relay 78. The auxiliary power busbar 68 is in electrical communication with the third relay 64 via both positive and negative connections P, N. The third relay 64 is in electrical communication with via separate positive and negative connections P, N to both the first power cell 12 and the second power cell 16. Both the first power cell 12 and the second power cell 16 are connected to the fourth relay 70 via positive connections P. Both the first and second power cells 12, 16 are further connected to the main power busbar 72 via negative connections N. The main power busbar 72 is connected to the fourth relay via positive connections P.

Figure 11:
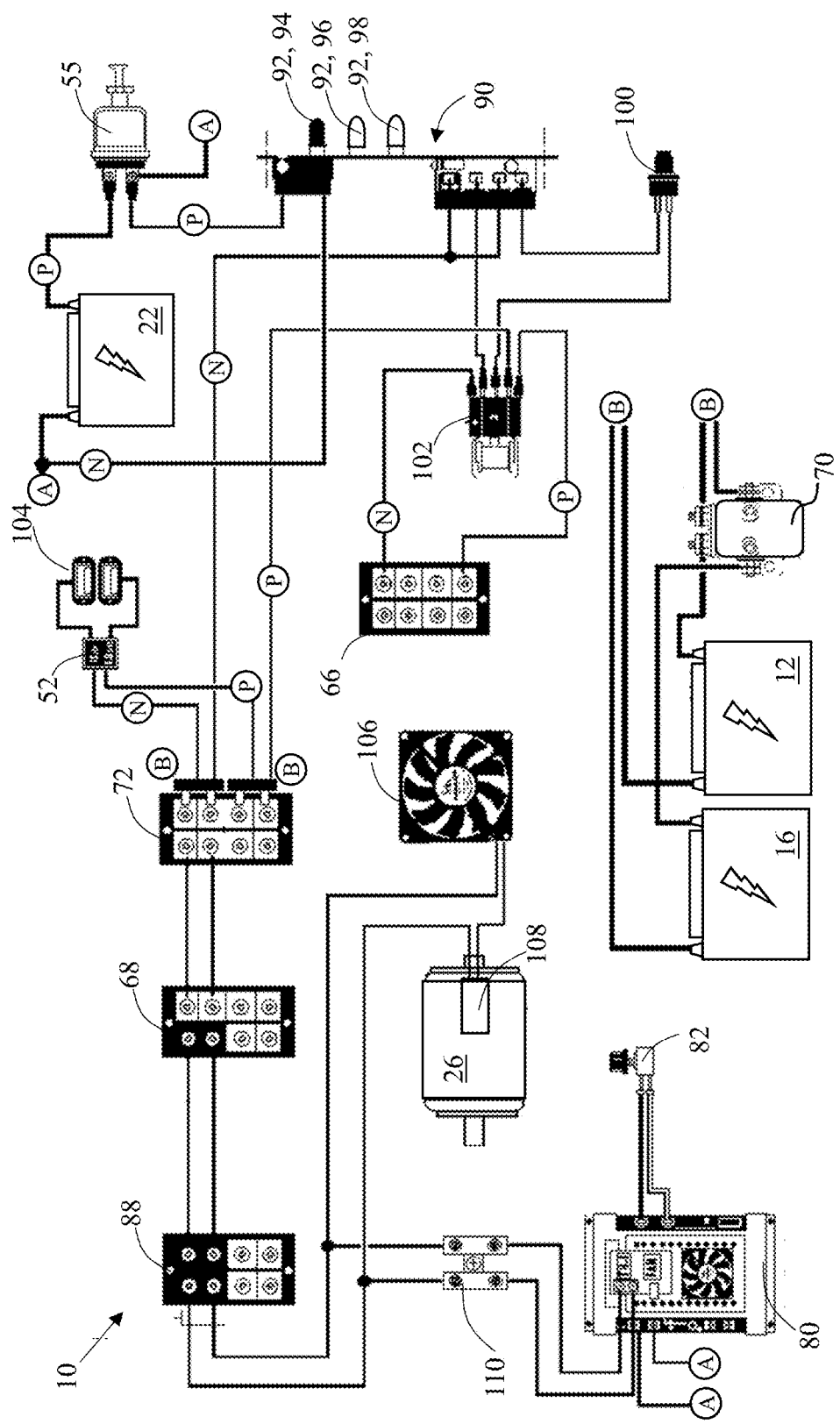
FIG. 11 illustrates electrical connections of an exemplary power supply charging system.

FIG. 11 illustrates a part of an electrical schematic of a power supply charging system 10. The power switch 55 is in electrical communication with a third power supply 22 via a positive connection P. The third power supply 22 is electrically connected to a charging status display 90 via a negative connection N. The charging status display 90 is electrically connected to the power switch 55 via a positive connection. The charging status display 90 includes a plurality of indicator lights 92. The plurality of indicator lights 92 include a system indicator light 94, a first power supply light 96, and a second power supply light 98. The system indicator light 94 is lit when the power supply charging system 10 is powered on and functioning. The first power supply light 96 when lit indicates the first power cell 12 is receiving a charge from the motor driven generator 28. The second power supply light 98 when lit indicates the second power cell 16 is receiving a charge from the motor driven generator 28. The charging status display 90 is electrically connected with the main power busbar 72. The charging status display 90 is also electrically connected a indicator light switch 100. Both the indicator light switch 100 and the charging status display 90 are electrically connected to a fifth relay 102. The fifth relay 102 is connected via both positive and negative connections P, N to the trigger busbar 66. The fifth relay 102 is electrically connected to the main power busbar 72. The main power busbar 72 is connected via both positive and negative connections P, N to one or more electrical power outlets 104 via a power converter 52. The one or more electrical power outlets 104 can include 110V outlets and/or USB outlets for charging devices. The main power busbar 72 is connected via connections B-B to the first and second power cells 12, 16 and the fourth relay 70. Main power busbar 72 is electrically connected to the auxiliary power busbar 68. The auxiliary power busbar 68 is electrically connected to the sensing busbar 88. The sensing busbar 88 is electrically connected to a cooling fan 106 and to a thermal coupler 108. The thermal coupler 108 is connected to both the motor 26 and the cooling fan 106. The sensing busbar 88 is connected to the motor speed controller 80 via a power junction 110. The motor speed controller 80 is electrically connected to a current limit control 82. The motor speed controller 80 is further electrically connected via A-A to both the third power supply 22 and the power switch 55.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A power supply charging system comprising:
 (a) a first power cell having electrical energy stored therein;
 (b) a second power cell having electrical energy stored therein, wherein the first power cell and the second power cell are adapted to not be in a discharging mode or a charging mode simultaneously;
 (c) a third power cell in electrical communication with the first power cell and the second power cell, wherein the third power cell is adapted to operably supply power to the first power cell when in the charging mode or the second power cell when in the charging mode; and
 (d) a control system which is adapted to alternate the power being supplied from the third power cell to the first power cell while in the charging mode and the second power cell while in the charging mode based on an occurrence of a pre-determined condition; and where the third power cell is adapted to receive alternating power from the first power cell when in the discharging mode and the second power cell when in the discharging mode.

2. The power supply charging system of claim 1, wherein a motor driven generator is adapted to operably switch between providing the power to the first power cell and to the second power cell.

3. The power supply charging system of claim 2, wherein an electric motor is connected to the motor driven generator to transmit the power received by the electric motor to the motor driven generator.

4. The power supply charging system of claim 3, wherein the third power cell is also in electrical communication with the electric motor, and wherein the third power cell is adapted to operably supply power to the motor driven generator via the electric motor.

5. The power supply charging system of claim 1, wherein the first power cell is a first bank of batteries and the second power cell is a second bank of batteries.

6. The power supply charging system of claim 5, wherein the first bank of batteries, the second bank of batteries, and/or the third power cell include: an alkaline battery, an aluminum battery, a carbon battery, a lithium battery, a lithium-ion battery, a mercury battery, a zinc battery, a lead-acid battery, a nickel battery, or a combination thereof.

7. The power supply charging system of claim 3, wherein a torque multiplier is connected between the electric motor and the motor driven generator.

8. The power supply charging system of claim 3, wherein the electric motor of the motor driven generator only supplies power to the motor driven generator and does not supply power to any other component of the power supply charging system.

9. The power supply charging system of claim 5, wherein the first bank of batteries in the discharging mode supplies power to a facility or equipment and wherein the second bank of batteries in the discharging mode supplies power to the same facility or the same equipment.

10. The power supply charging system of claim 3, wherein one or more current inverters are electrically connected to the first power cell and the second power cell so as to convert a direct electrical current from the first power cell, the second power cell, or both to an alternating electrical current to be received by a facility or equipment.

11. The power supply charging system of claim 10, wherein the motor driven generator is incapable of directly supplying power to the one or more current inverters.

12. The power supply charging system of claim 3, wherein the pre-determined condition includes: a duration of time, a temperature, a voltage, a current, or a combination thereof.

13. The power supply charging system of claim 12, wherein the control system includes a power cell managing module adapted to alternate the motor driven generator to operably switch between providing power to the first power cell during the charging mode of the first power cell and providing power to the second power cell during the charging mode of the second power cell based on an occurrence of the pre-determined condition.

14. The power supply charging system of claim 3, wherein the control system includes a charge control module adapted to detect an occurrence of a pre-determined power supply condition from at least one of the first power cell or the second power cell while in the charging mode or a resting mode and upon the occurrence of the pre-determined power supply condition activates the motor driven generator to provide power to the first power cell while in the charging or resting mode or the second power cell while in the charging or resting mode.

15. The power supply charging system of claim 14, wherein the pre-determined power supply condition includes: a duration of time, a temperature, a voltage, a current, or a combination thereof.

16. The power supply charging system of claim 1, wherein one or more power outlets are in electrical communication with the first power cell and the second power cell, the one or more power outlets including one or more shore power outlets, one or more USB power outlets, one or more 110V power outlets, or a combination thereof to transmit the power supply from the first power cell when in the discharging mode and the second power cell when in the discharging mode to a power receiving system.

17. The power supply charging system of claim 13, wherein the power cell managing module sends a direct electrical current from the first power cell and the second power cell to one or more current inverters to be converted into an alternating electrical current.

18. The power supply charging system of claim 13, wherein the power cell managing module sends a direct electrical current to the third power cell to recharge the third power cell.

19. The power supply charging system of claim 1, wherein the power supply charging system includes a voltage converter to reduce a direct current voltage provided by either or both the first power cell during the discharging mode or the second power cell during the discharging mode.

* * * * *